United States Patent
Hasegawa

(10) Patent No.: US 12,101,009 B2
(45) Date of Patent: Sep. 24, 2024

(54) MOTOR AND COMPRESSOR

(71) Applicant: FUJITSU GENERAL LIMITED, Kanagawa (JP)

(72) Inventor: Tomooki Hasegawa, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 474 days.

(21) Appl. No.: 17/431,142

(22) PCT Filed: Oct. 16, 2019

(86) PCT No.: PCT/JP2019/040740
§ 371 (c)(1),
(2) Date: Aug. 13, 2021

(87) PCT Pub. No.: WO2020/174740
PCT Pub. Date: Sep. 3, 2020

(65) Prior Publication Data
US 2022/0140687 A1 May 5, 2022

(30) Foreign Application Priority Data
Feb. 28, 2019 (JP) .................................. 2019-035788

(51) Int. Cl.
*H02K 3/52* (2006.01)
*F25B 1/00* (2006.01)
(Continued)

(52) U.S. Cl.
CPC .............. *H02K 3/522* (2013.01); *F25B 1/00* (2013.01); *F25B 31/02* (2013.01); *H02K 21/16* (2013.01); *H02K 2203/12* (2013.01)

(58) Field of Classification Search
CPC .... H02K 3/522; H02K 21/16; H02K 2203/12; F25B 1/00; F25B 31/02
See application file for complete search history.

(56) References Cited

U.S. PATENT DOCUMENTS 4,835,430 A * 5/1989 Siu ........................ H02K 13/04
310/234
2004/0070293 A1* 4/2004 Kabasawa .............. H02K 3/522
310/71
(Continued)

FOREIGN PATENT DOCUMENTS

EP 2207254 A2 7/2010
JP 2001-218409 A 8/2001
(Continued)

OTHER PUBLICATIONS

WO-2011007881-A1 mt (Year: 2011).*
Feb. 28, 2024, Chinese Office Action issued for related CN Application No. 201980092528.7.

*Primary Examiner* — Gordon A Jones
(74) *Attorney, Agent, or Firm* — Paratus Law Group, PLLC

(57) ABSTRACT

A motor includes: a rotor, a stator; and a cylindrical insulator fixed to an end portion of the stator. The stator includes a plurality of teeth, a plurality of winding wires each including a winding portion wound around each of the plurality of teeth, a neutral wire provided on one end side of the winding portion, and a power wire provided on the other end side of the winding portion, and a neutral point at which a plurality of neutral wires are electrically connected via a connecting member. The insulator is provided with a drawing notch penetrating from an outer side to an inner side of the insulator. The plurality of neutral wires are routed along an outer peripheral surface of the insulator, pass through the drawing notch, and are drawn from the outer side to the inner side of the insulator, and the plurality of neutral wires drawn are fixed.

6 Claims, 25 Drawing Sheets

(51) Int. Cl.
  *F25B 31/02* (2006.01)
  *H02K 21/16* (2006.01)

(56) References Cited

U.S. PATENT DOCUMENTS

| | | | |
|---|---|---|---|
| 2007/0182265 A1* | 8/2007 | Makino | H02K 3/522 |
| | | | 310/179 |
| 2011/0241476 A1* | 10/2011 | Burch | H02K 15/0068 |
| | | | 310/257 |
| 2011/0243768 A1 | 10/2011 | Taema | |
| 2012/0025661 A1* | 2/2012 | Sakane | H02K 3/522 |
| | | | 310/215 |
| 2012/0104893 A1* | 5/2012 | Kitaori | H02K 3/522 |
| | | | 310/195 |
| 2012/0112584 A1* | 5/2012 | De Filippis | H02K 3/522 |
| | | | 310/71 |
| 2016/0294240 A1* | 10/2016 | Kawamoto | H02K 3/522 |
| 2017/0047828 A1* | 2/2017 | Hoshina | H02K 15/066 |
| 2017/0149299 A1 | 5/2017 | Sakamoto et al. | |
| 2017/0317549 A1 | 11/2017 | Ishizaki | |
| 2020/0381973 A1* | 12/2020 | Chen | H02K 1/146 |
| 2021/0351650 A1* | 11/2021 | Uchida | H02K 3/522 |
| 2021/0367465 A1* | 11/2021 | Takahashi | H02P 27/08 |
| 2022/0209621 A1* | 6/2022 | Yoda | H02K 1/148 |
| 2022/0294280 A1* | 9/2022 | Hasegawa | F04B 39/12 |
| 2022/0344996 A1* | 10/2022 | Nickel | H02K 3/522 |
| 2023/0299634 A1* | 9/2023 | Mitteer | F04C 15/0096 |
| | | | 417/410.4 |

FOREIGN PATENT DOCUMENTS

| | | |
|---|---|---|
| JP | 2001-314055 A | 11/2001 |
| JP | 2005-253286 A | 9/2005 |
| JP | 2006-304577 A | 11/2006 |
| JP | 2010-166643 A | 7/2010 |
| JP | 2011-041458 A | 2/2011 |
| JP | 2011-217503 A | 10/2011 |
| JP | 2013-240128 A | 11/2013 |
| JP | 2013-243822 A | 12/2013 |
| JP | 2015-133772 A | 7/2015 |
| JP | 2018-157711 A | 10/2018 |
| JP | 2018-201307 A | 12/2018 |
| WO | WO-2011007881 A1 * | 1/2011 ............. H02K 3/522 |
| WO | WO 2016/006475 A1 | 1/2016 |
| WO | WO 2016/076044 A1 | 5/2016 |

* cited by examiner (A-A)

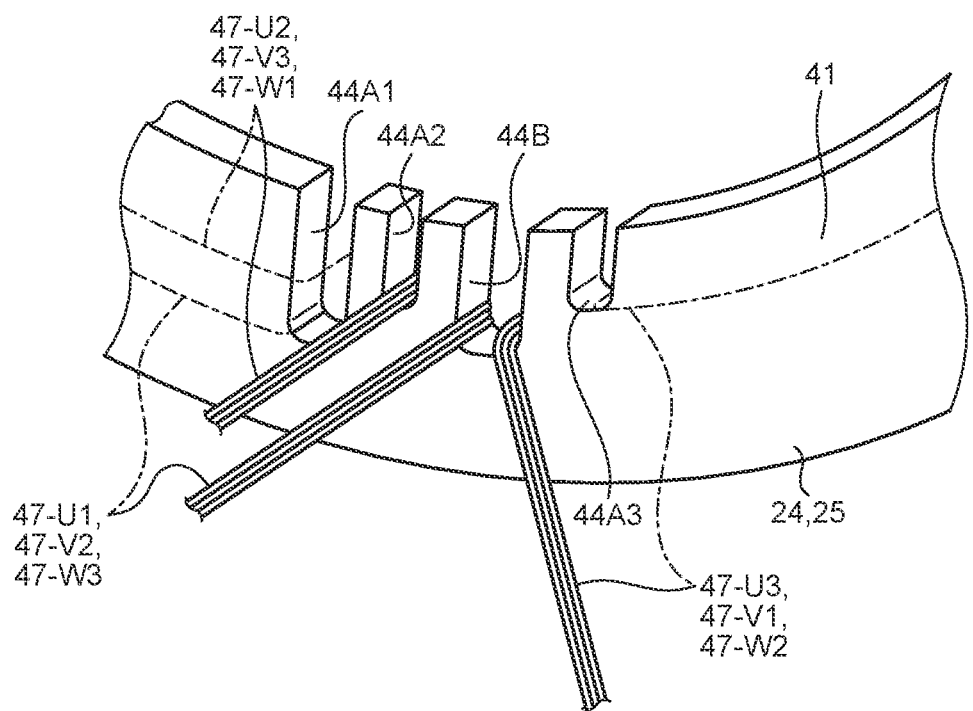

MOTOR AND COMPRESSOR

CROSS REFERENCE TO PRIOR APPLICATION

This application is a National Stage Patent Application of PCT International Patent Application No. PCT/JP2019/040740 (filed on Oct. 16, 2019) under 35 U.S.C. § 371, which claims priority to Japanese Patent Application No. 2019-035788 (filed on Feb. 28, 2019), which are all hereby incorporated by reference in their entirety.

FIELD

The present invention relates to a motor and a compressor.

BACKGROUND

For example, a compressor includes a motor to drive a compression unit that compresses a refrigerant. The motor includes a rotor arranged inside a container of the compressor and provided with a permanent magnet, and a stator that rotates the rotor by generating a rotating magnetic field, and transmits rotational power to the compression unit via a shaft fixed to the rotor. The stator has a plurality of teeth, and a winding wire is formed by winding of an electric wire around each of the plurality of teeth. In the winding wire, a plurality of winding portions respectively wound around the teeth, are star-connected (starlike-connected). One end of the winding portion, which is wound around each tooth, is connected to a power supply, and the other end of the winding portion (referred to as neutral wire) is connected to a neutral point.

CITATION LIST

Patent Literature

Patent Literature 1: Japanese Patent Application Laid-open No. 2010-166643

SUMMARY

Technical Problem

For example, in a case of a nine-slot three-phase motor, there is a case where nine neutral wires are bundled and joined by soldering in order that each neutral wire is connected at a neutral point. In a case where soldering is performed, an insulating film of an electric wire needs to be peeled off, and workability in assembling of a motor is low. Thus, instead of joining by soldering, it has been proposed to join neutral wires by crimping with a caulking machine via a connection terminal.

In a case where neutral wires are joined by crimping, it becomes difficult to properly join each neutral wire in a case where four or more neutral wires are bundled. Thus, it is preferable to crimp three neutral wires at a time. Thus, in a case where nine neutral wires are connected at neutral points, bundles of three sets of neutral wires are generated with three neutral wires as one set. Thus, since wires are connected with every predetermined three neutral wires as a combination and three sets of neutral wires are handled in a motor assembling process, there is a problem that handling of the nine neutral wires becomes complicated, workability in the assembling is decreased, and a wire connection variation in a motor is generated.

As a countermeasure against this problem, when the nine neutral wires are handled, it is conceivable to handle three neutral wires as one set by routing every three neutral wires along a circumferential direction of an outer peripheral surface of a cylindrical insulator that is fixed to an end portion of the stator, and twisting the three neutral wires on an outer side of the insulator. However, in this case, a hump is generated at a portion where the three neutral wires are twisted on the outer side of the insulator. Since the hump bulges from the outer peripheral surface of the insulator in a radial direction of the insulator, the hump approaches an inner surface of the container when the motor is arranged inside the metal container, and there is a risk that an insulation distance of the neutral wire decreases. In addition, when the neutral wire is drawn to an inner side of the insulator in order to secure the insulation distance, there is a disadvantage that it is difficult to draw the neutral wire to the inner side of the insulator since a force that restricts the movement of the neutral wire acts on the neutral wire, which is twisted on the outer side of the insulator.

The disclosed technology has been made in view of the above, and is to provide a motor and a compressor capable of improving workability in assembling of the motor and easily securing an insulation distance of a neutral wire.

Solution to Problem

According to an aspect of the embodiments, a motor includes: a rotor; a stator that generates a magnetic field for rotating the rotor; and a cylindrical insulator fixed to an end portion of the stator, wherein the stator includes a plurality of teeth, a plurality of winding wires each including a winding portion wound around each of the plurality of teeth, a neutral wire provided on one end side of the winding portion, and a power wire provided on the other end side of the winding portion, and a neutral point at which a plurality of the neutral wires are electrically connected via a connecting member, the insulator is provided with a drawing notch penetrating from an outer side to an inner side of the insulator, the plurality of neutral wires are routed along an outer peripheral surface of the insulator, pass through the drawing notch, and are drawn from the outer side to the inner side of the insulator, and the plurality of neutral wires drawn are fixed.

Advantageous Effects of Invention

According to one aspect of the motor disclosed in the present application, the workability in assembling of the motor can be improved, and the insulation distance of the neutral wire can be easily secured.

BRIEF DESCRIPTION OF DRAWINGS

FIG. 14 is a perspective view illustrating a state, in which every three neutral wires of nine neutral wires pass through drawing slits and a pull-out slit, and are temporarily fixed in another embodiment.

DESCRIPTION OF EMBODIMENTS

In the following, embodiments of a motor disclosed in the present application will be described in detail on the basis of the drawings. Note that the motor disclosed in the present application is not limited by the following embodiments.

EMBODIMENT

Figure 1:
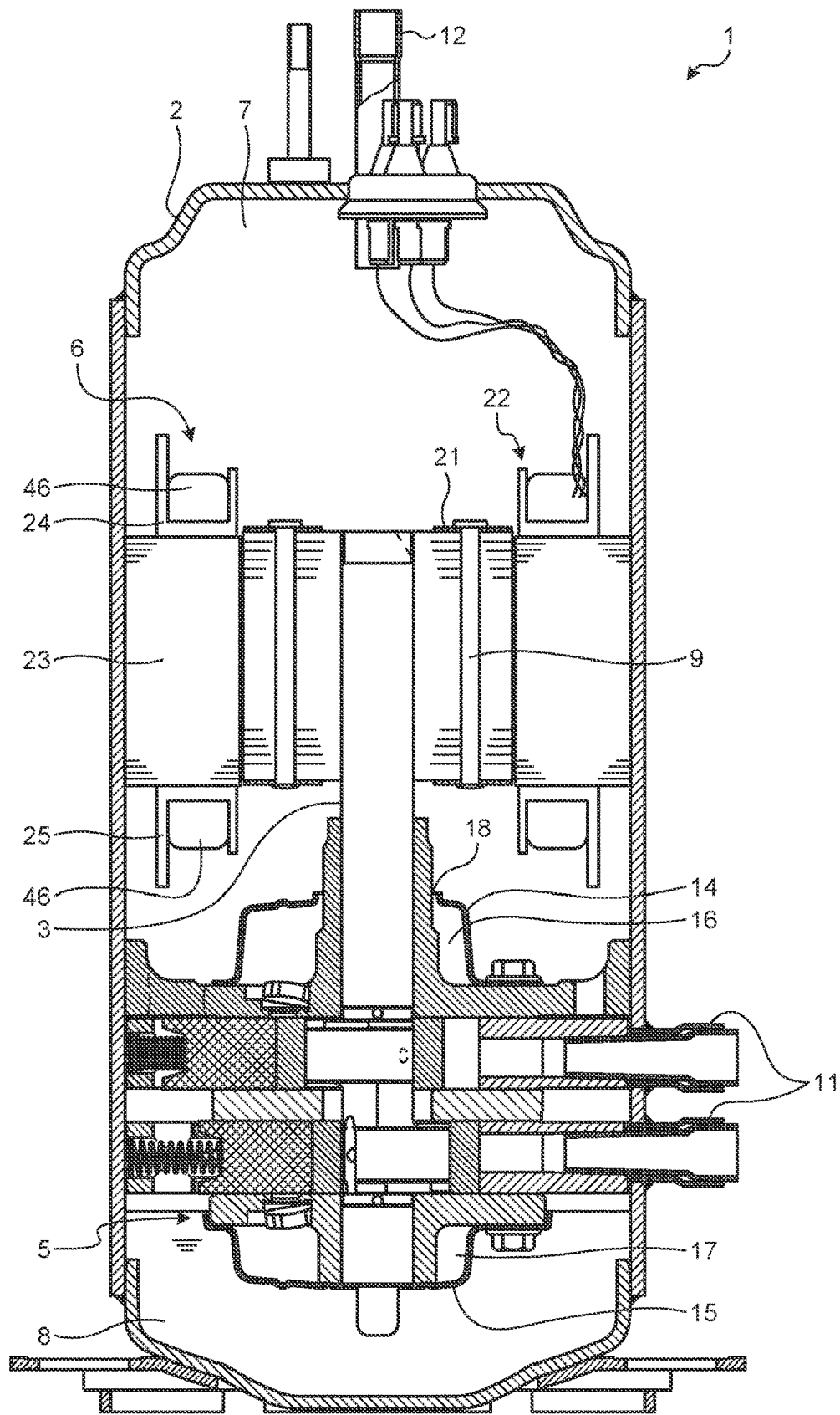
FIG. 1 is a longitudinal sectional view illustrating a compressor that includes a three-phase motor of an embodiment.

FIG. 1 is a longitudinal sectional view illustrating a compressor that includes a three-phase motor of an embodiment. As illustrated in FIG. 1, a compressor 1 is a so-called rotary compressor, and includes a container 2, a shaft 3, a compression unit 5, and a three-phase motor 6. The container 2 is formed of a metal material, and forms a sealed internal space 7. The internal space 7 is formed in a substantially columnar shape. The container is formed in such a manner that a central axis of a column, which forms the internal space 7, is parallel to a vertical direction when vertically placed on a horizontal plane. In the container 2, an oil reservoir 8 is formed in a lower part of the internal space 7. Refrigeration oil, which is a lubricating oil to lubricate the compression unit 5, is stored in the oil reservoir 8. A suction pipe 11 for sucking a refrigerant and a discharge pipe 12 for discharging a compressed refrigerant, are connected to the container 2. The shaft 3 as a rotating shaft, is formed in a rod shape, and is arranged in the internal space 7 of the container 2 in such a manner that one end thereof is arranged in the oil reservoir 8. The shaft 3 is supported by the container 2 in a manner of being rotatable around the central axis of the column forming the internal space 7. By being rotated, the shaft 3 supplies the refrigeration oil stored in the oil reservoir 8 to the compression unit 5.

The compression unit 5 is arranged in the lower part of the internal space 7, and is arranged on an upper side of the oil reservoir 8. The compressor 1 further includes an upper muffler cover 14 and a lower muffler cover 15. The upper muffler cover 14 is arranged in an upper part of the compression unit 5 in the internal space 7. The upper muffler cover 14 forms an upper muffler chamber 16 inside. The lower muffler cover 15 is provided in a lower part of the compression unit 5 in the internal space 7, and is arranged in an upper part of the oil reservoir 8. The lower muffler cover 15 forms a lower muffler chamber 17 inside. The lower muffler chamber 17 communicates with the upper muffler chamber 16 via a communication passage (not illustrated) formed in the compression unit 5. A compressed refrigerant discharge hole 18 is formed between the upper muffler cover 14 and the shaft 3, and the upper muffler chamber 16 communicates with the internal space 7 via the compressed refrigerant discharge hole 18.

The compression unit 5 compresses a refrigerant supplied by a rotation of the shaft 3 from the suction pipe 11, and supplies the compressed refrigerant to the upper muffler chamber 16 and the lower muffler chamber 17. The refrigerant is compatible with the refrigeration oil. The three-phase motor 6 is arranged in the upper part of the compression unit 5 in the internal space 7.

Figure 2:
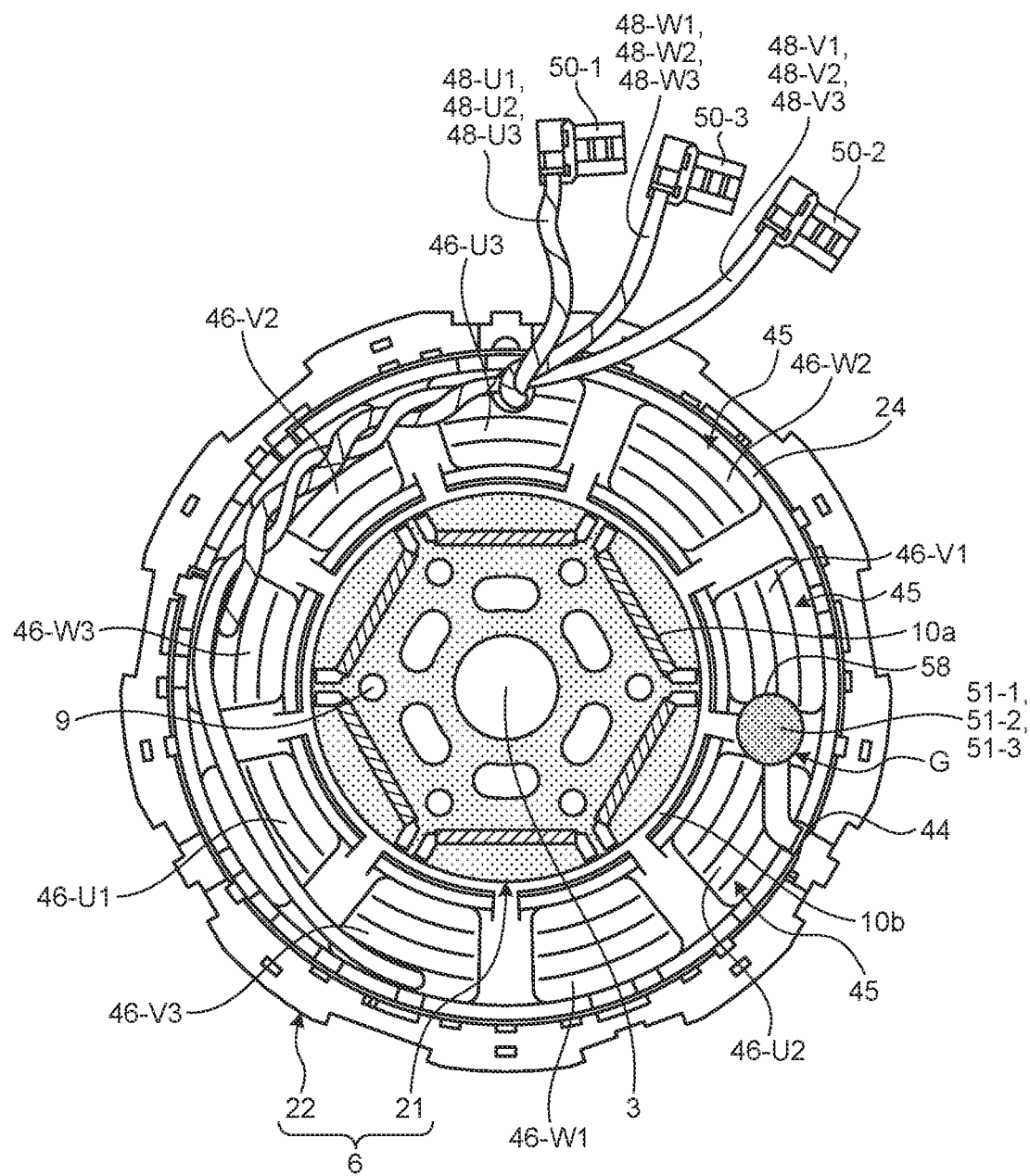
FIG. 2 is a plan view illustrating the three-phase motor of the embodiment from a side of an upper insulator.

FIG. 2 is a plan view illustrating the three-phase motor 6 in the embodiment from a side of an upper insulator. As illustrated in FIG. 1 and FIG. 2, the three-phase motor 6 includes a rotor 21 and a stator 22. The rotor 21 is formed in a columnar shape by lamination of a plurality of thin silicon steel plates (magnetic material), and is integrated by a plurality of rivets 9. In the rotor 21 in which the shaft 3 is inserted and fixed, six slit-shaped magnet embedding holes 10a are formed at a center of the rotor 21 in such a manner as to form each side of a hexagon with the shaft 3 as a center. The magnet embedding holes 10a are formed at predetermined intervals in a circumferential direction of the rotor 21.

A plate-shaped permanent magnet 10b is embedded in the magnet embedding holes 10a.

The stator 22 is formed in a substantially cylindrical shape, is arranged in such a manner as to surround the rotor 21, and is fixed to the container 2. The stator 22 includes a stator core 23, an upper insulator 24, a lower insulator 25, and a plurality of winding wires 46. The upper insulator 24 is fixed to an upper end part of the stator core 23. The lower insulator 25 is fixed to a lower end part of the stator core 23. The upper insulator 24 and the lower insulator 25 are examples of insulating portions that insulate the stator core 23 and the winding wires 46.

Figure 3:
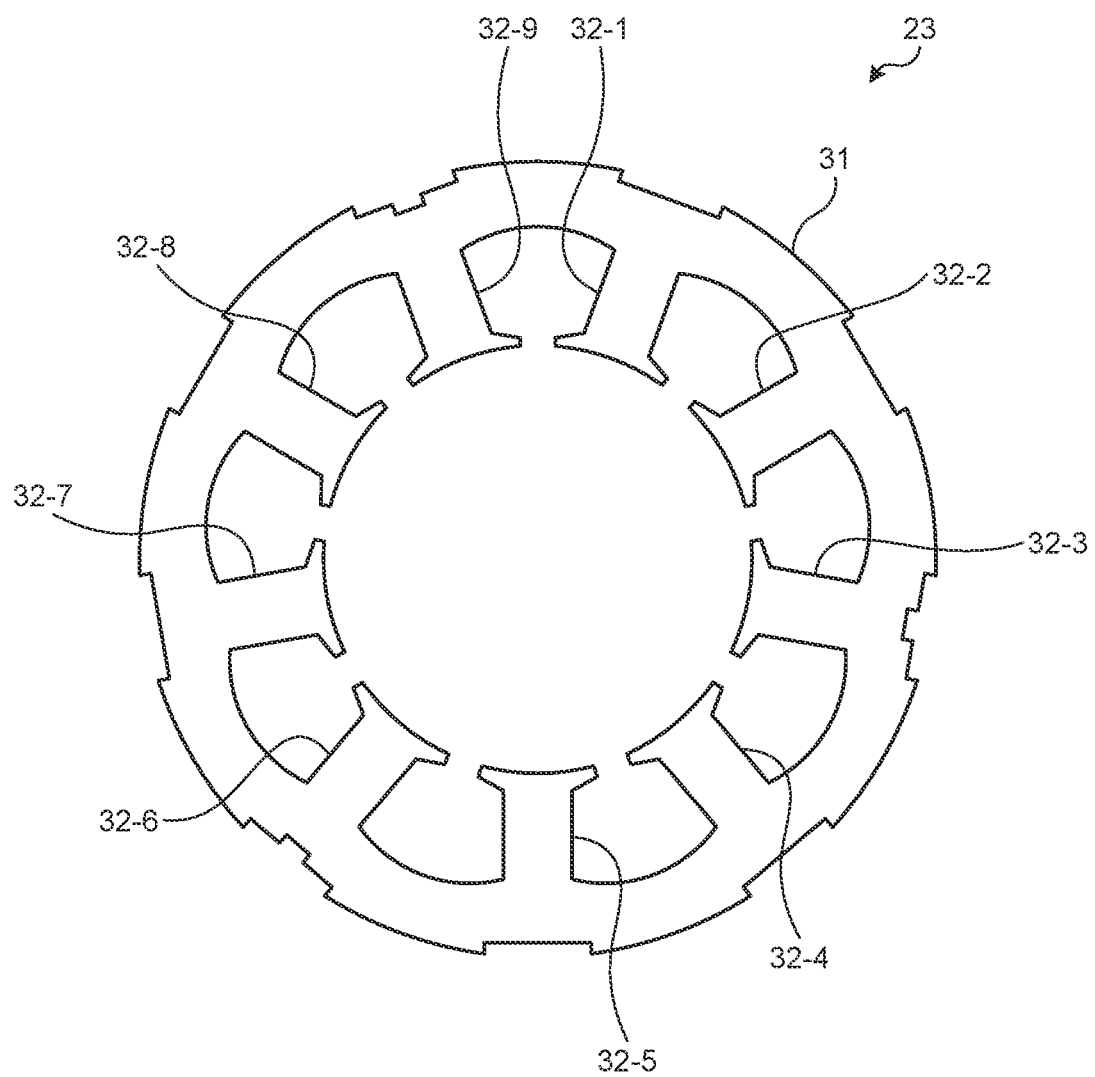
FIG. 3 is a bottom view illustrating a stator core in the embodiment.

FIG. 3 is a bottom view illustrating the stator core 23 in the embodiment. The stator core 23 is formed by lamination of a plurality of plates made of a soft magnetic material such as a silicon steel plate, and includes a yoke portion 31 and a plurality of stator core tooth portions 32-1 to 32-9 as illustrated in FIG. 3. The yoke portion 31 is formed in a substantially cylindrical shape. A first stator core tooth portion 32-1 among the plurality of stator core tooth portions 32-1 to 32-9, is formed in a substantially pillar shape. One end of the first stator core tooth portion 32-1 is formed continuously with an inner peripheral surface of the yoke portion 31, that is, formed in such a manner as to protrude from the inner peripheral surface of the yoke portion 31. The stator core tooth portions other than the first stator core tooth portion 32-1 among the plurality of stator core tooth portions 32-1 to 32-9, are also formed in a substantially pillar shape similarly to the first stator core tooth portion 32-1, and protrude from the inner peripheral surface of the yoke portion 31. The plurality of stator core tooth portions 32-1 to 32-9 are arranged at equal intervals of 40 degrees on the inner peripheral surface of the yoke portion 31.

Figure 4:
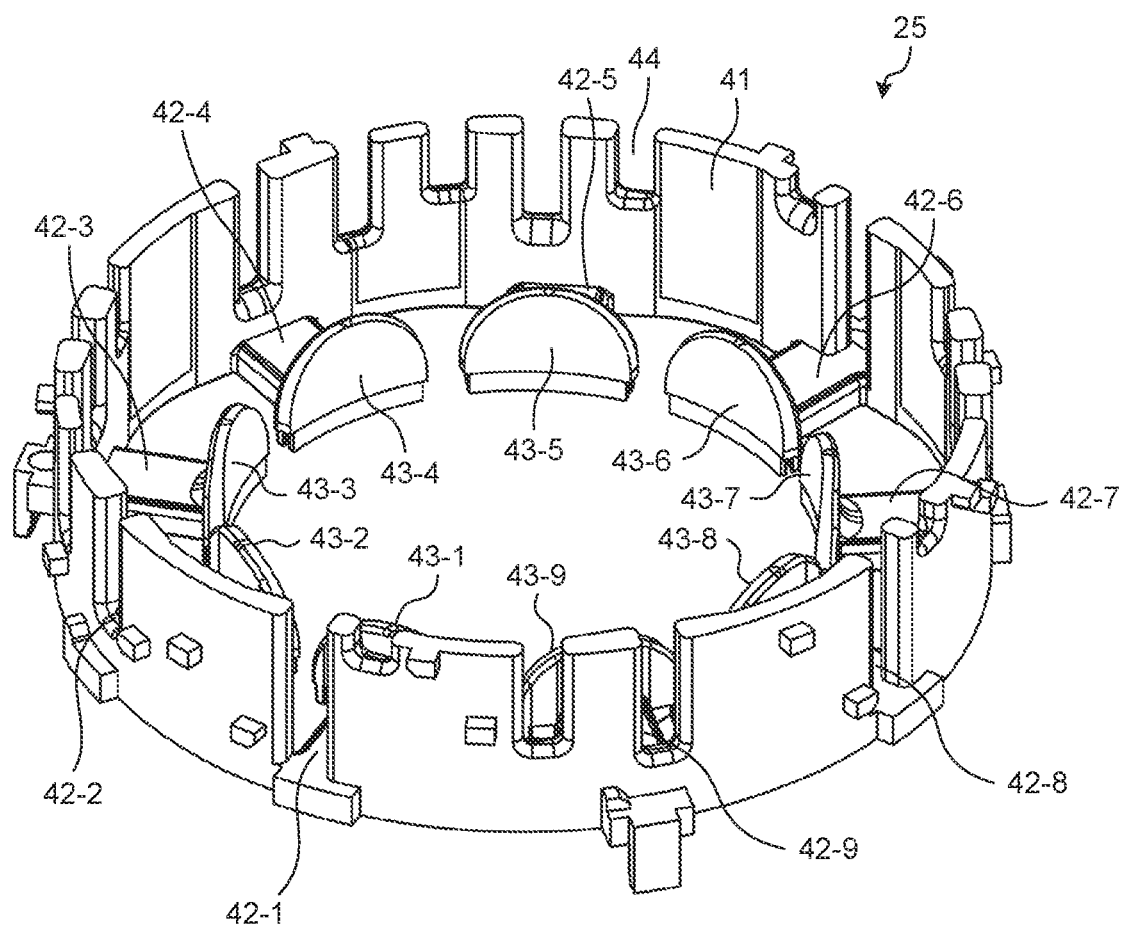
FIG. 4 is a perspective view illustrating a lower insulator in the embodiment.

FIG. 4 is a perspective view illustrating the lower insulator 25 in the embodiment. The lower insulator 25 is formed of an insulator such as a polybutylene terephthalate resin (PBT) in a cylindrical shape, and includes an outer peripheral wall portion 41, a plurality of insulator tooth portions 42-1 to 42-9, and a plurality of flange portions 43-1 to 43-9 as illustrated in FIG. 4. The outer peripheral wall portion 41 is formed in a substantially cylindrical shape. A plurality of slits 44 are formed in the outer peripheral wall portion 41. A first insulator tooth portion 42-1 among the plurality of insulator tooth portions 42-1 to 42-9, is formed in a straight pillar shape having a substantially semicircular cross section. One end of the first insulator tooth portion 42-1 is formed continuously with an inner peripheral surface of the outer peripheral wall portion 41, that is, formed in such a manner as to protrude from the inner peripheral surface of the outer peripheral wall portion 41. The insulator tooth portions other than the first insulator tooth portion 42-1 among the plurality of insulator tooth portions 42-1 to 42-9, are also formed in a straight pillar shape, and are formed in such a manner as to protrude from the inner peripheral surface of the outer peripheral wall portion 41 similarly to the first insulator tooth portion 42-1. The plurality of insulator tooth portions 42-1 to 42-9 are arranged at equal intervals of 40 degrees on the inner peripheral surface of the outer peripheral wall portion 41.

The plurality of flange portions 43-1 to 43-9 correspond to the plurality of insulator tooth portions 42-1 to 42-9, and each has a substantially semicircular plate shape. A first flange portion 43-1, which corresponds to the first insulator tooth portion 42-1, among the plurality of flange portions 43-1 to 43-9, is formed continuously with the other end of the first insulator tooth portion 42-1. The flange portions other than the first flange portion 43-1 among the plurality of flange portions 43-1 to 43-9, are also formed continuously with the other ends of the plurality of insulator tooth portions 42-1 to 42-9 similarly to the first flange portion 43-1.

The upper insulator 24 is also formed in a manner similar to the lower insulator 25. That is, the upper insulator 24 is formed of an insulator in a cylindrical shape, and includes an outer peripheral wall portion 41, a plurality of insulator tooth portions 42-1 to 42-9, and a plurality of flange portions 43-1 to 43-9.

Figure 5:
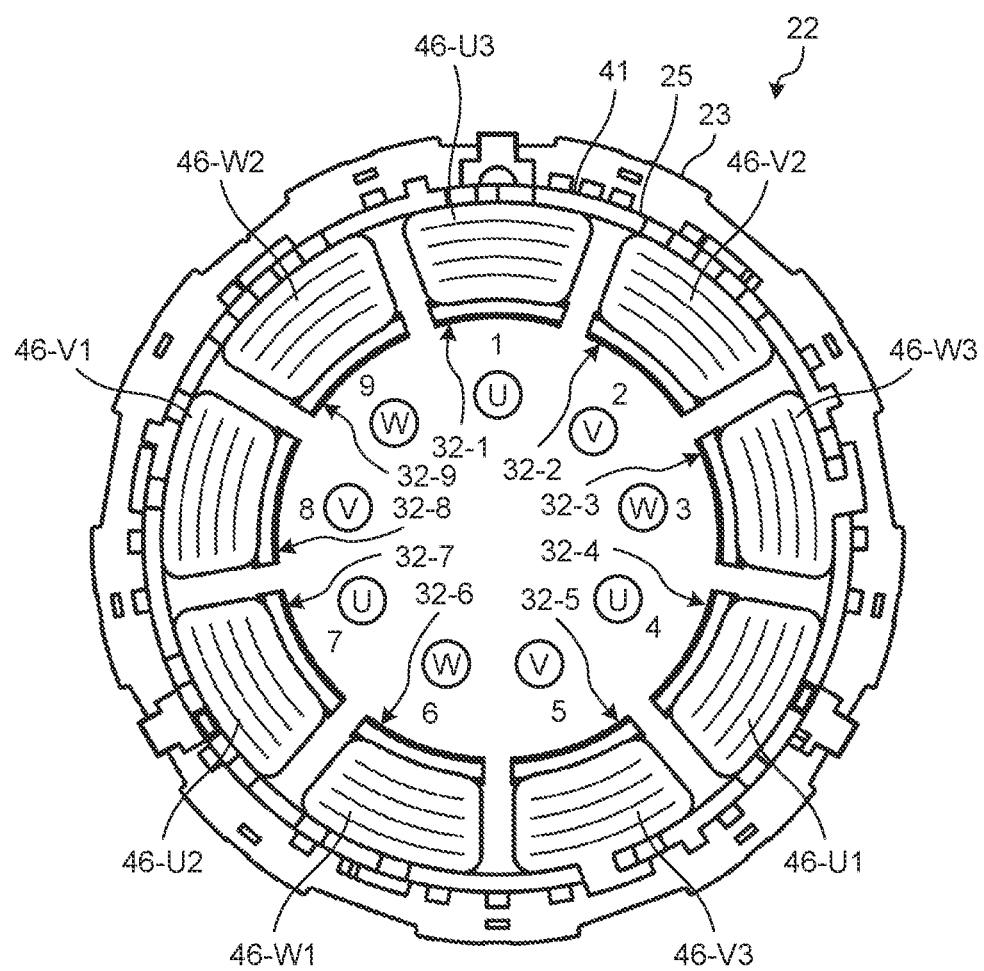
FIG. 5 is a bottom view illustrating a stator in the embodiment.

FIG. 5 is a bottom view illustrating the stator 22 in the embodiment. As illustrated in FIG. 5, the plurality of winding wires 46 are respectively wound around the plurality of stator core tooth portions 32-1 to 32-9 of the stator core 23. A winding portion 45 is formed by each of the winding wires 46 in each of the stator core tooth portions 32-1 to 32-9. The three-phase motor in the embodiment is a concentrated winding-type motor with six poles and nine slots (see FIG. 2). The plurality of winding wires 46 includes a plurality of U-phase winding wires 46-U1 to 46-U3, a plurality of V-phase winding wires 46-V1 to 46-V3, and a plurality of W-phase winding wires 46-W1 to 46-W3.

The U-phase winding wires have a plurality of winding wires. More specifically, a first U-phase winding wire 46-U1, a second U-phase winding wire 46-U2, and a third U-phase winding wire 46-U3, are included as the U-phase winding wires. The first U-phase winding wire 46-U1 is wound around a fourth stator core tooth portion 32-4. The second U-phase winding wire 46-U2 is wound around a seventh stator core tooth portion 32-7. The third U-phase winding wire 46-U3 is wound around the first stator core tooth portion 32-1.

The V-phase winding wires have a plurality of winding wires. More specifically, a first V-phase winding wire 46-V1, a second V-phase winding wire 46-V2, and a third V-phase winding wire 46-V3, are included as the V-phase winding wires. The first V-phase winding wire 46-V1 is wound around an eighth stator core tooth portion 32-8. The second V-phase winding wire 46-V2 is wound around a second stator core tooth portion 32-2. The third V-phase winding wire 46-V3 is wound around a fifth stator core tooth portion 32-5.

The W-phase winding wires have a plurality of winding wires. More specifically, a first W-phase winding wire 46-W1, a second W-phase winding wire 46-W2, and a third W-phase winding wire 46-W3, are included as the W-phase winding wires. The first W-phase winding wire 46-W1 is wound around a sixth stator core tooth portion 32-6. The second W-phase winding wire 46-W2 is wound around a ninth stator core tooth portion 32-9. The third W-phase winding wire 46-W3 is wound around a third stator core tooth portion 32-3.

The third U-phase winding wire 46-U3 is wound around the first stator core tooth portion 32-1 with the first insulator tooth portion 42-1 of the lower insulator 25, the first insulator tooth portion of 42-1 the upper insulator 24, and an insulating film (not illustrated) arranged between the insulators 24 and 25. Thus, the third U-phase winding wire 46-U3 is properly insulated from the first stator core tooth portion 32-1 by the upper insulator 24 and the lower insulator 25, and is properly insulated from the stator core 23. Furthermore, the third U-phase winding wire 46-U3 is wound in such a manner as to be sandwiched between the first flange portion 43-1 and the outer peripheral wall portion 41 of the lower insulator 25, and is wound in such a manner as to be sandwiched between a first flange portion 43-1 and the outer peripheral wall portion 41 of the upper insulator 24. Thus, so-called winding failure in which the third U-phase winding wire 46-U3 comes off from the first stator core tooth portion 32-1 toward a side of the rotor 21, is prevented by the upper insulator 24 and the lower insulator 25.

The winding wires other than the third U-phase winding wire 46-U3 among the plurality of winding wires 46, are also properly insulated from the stator core 23 by the upper insulator 24 and the lower insulator 25, and winding failure is prevented.

Figure 6:
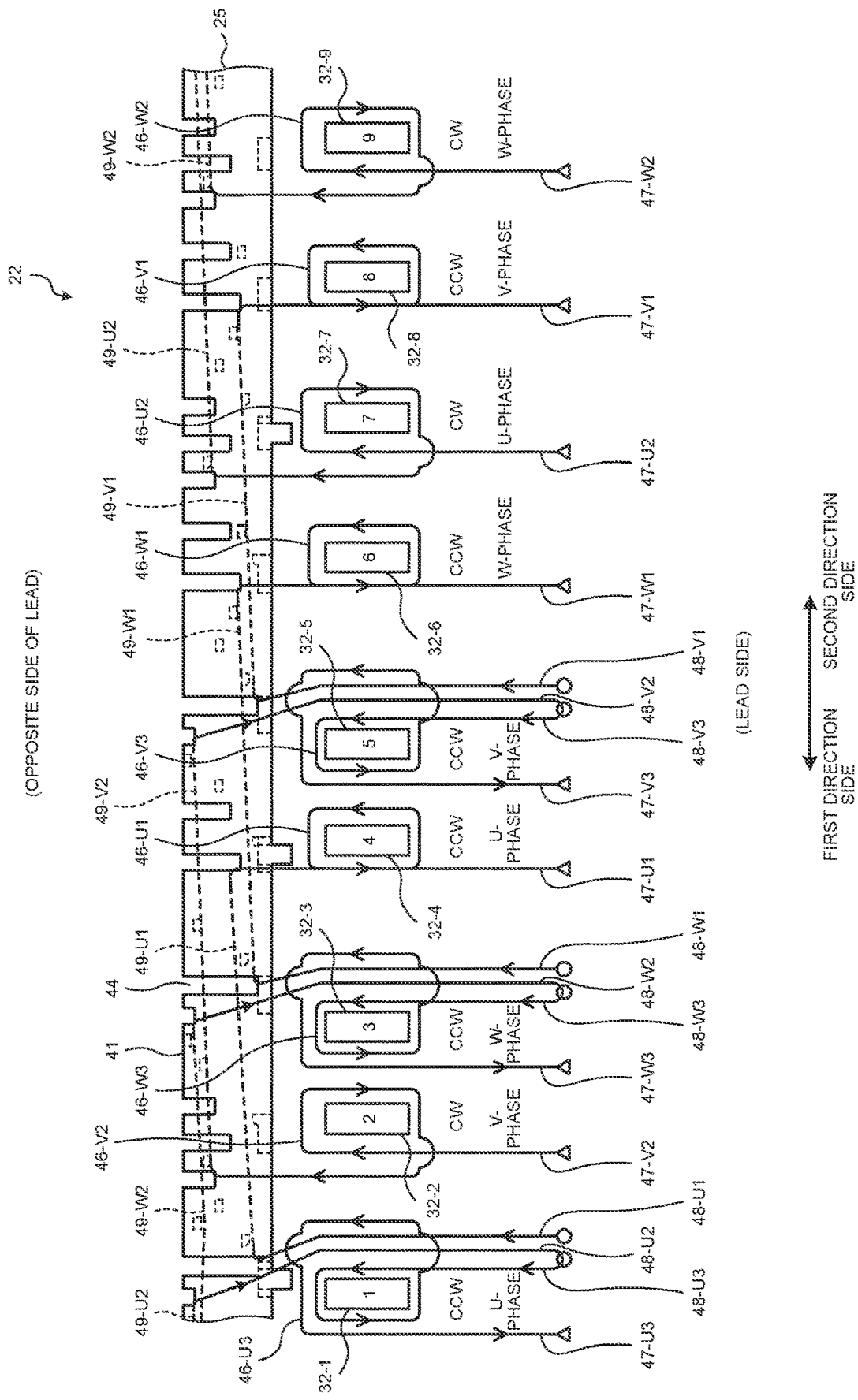
FIG. 6 is a development diagram illustrating a plurality of winding wires in the embodiment.

FIG. 6 is a development diagram illustrating the plurality of winding wires 46 in the embodiment. As illustrated in FIG. 6, the first U-phase winding wire 46-U1 is wound counterclockwise around the fourth stator core tooth portion 32-4. The second U-phase winding wire 46-U2 is wound clockwise around the seventh stator core tooth portion 32-7. The third U-phase winding wire 46-U3 is wound counterclockwise around the first stator core tooth portion 32-1. The first V-phase winding wire 46-V1 is wound counterclockwise around the eighth stator core tooth portion 32-8. The second V-phase winding wire 46-V2 is wound clockwise around the second stator core tooth portion 32-2. The third V-phase winding wire 46-V3 is wound counterclockwise around the fifth stator core tooth portion 32-5. The first W-phase winding wire 46-W1 is wound counterclockwise around the sixth stator core tooth portion 32-6. The second W-phase winding wire 46-W2 is wound clockwise around the ninth stator core tooth portion 32-9. The third W-phase winding wire 46-W3 is wound counterclockwise around the third stator core tooth portion 32-3.

The stator 22 further includes a plurality of U-phase neutral wires 47-U1 to 47-U3, a plurality of V-phase neutral wires 47-V1 to 47-V3, and a plurality of W-phase neutral wires 47-W1 to 47-W3. The plurality of U-phase neutral wires 47-U1 to 47-U3, the plurality of V-phase neutral wires 47-V1 to 47-V3, and the plurality of W-phase neutral wires 47-W1 to 47-W3, are arranged on a side of the upper insulator 24 that is farther from the lower insulator 25 than the plurality of stator core tooth portions 32-1 to 32-9. Note that since a side of a lead, which is a power wire, is also arranged on the side of the upper insulator 24, the side of the upper insulator 24 is also referred to as a lead side in the present description.

One end of a first U-phase neutral wire 47-U1 is electrically connected to the first U-phase winding wire 46-U1. The one end of the first U-phase neutral wire 47-U1 is arranged on a first direction side (left side in FIG. 6) of the fourth stator core tooth portion 32-4, and the other end thereof is arranged on the lead side that is farther from the lower insulator 25 compared to the fourth stator core tooth portion 32-4. One end of a second U-phase neutral wire 47-U2 is electrically connected to the second U-phase winding wire 46-U2. The one end of the second U-phase neutral wire 47-U2 is arranged on the first direction side of the seventh stator core tooth portion 32-7, and the other end thereof is arranged on the lead side compared to the seventh stator core tooth portion 32-7. One end of a third U-phase neutral wire 47-U3 is electrically connected to the third U-phase winding wire 46-U3. The one end of the third U-phase neutral wire 47-U3 is arranged on the first direction side of the first stator core tooth portion 32-1, and the other end thereof is arranged on the lead side compared to the first stator core tooth portion 32-1.

The plurality of V-phase neutral wires 47-V1 to 47-V3 include a first V-phase neutral wire 47-V1, a second V-phase neutral wire 47-V2, and a third V-phase neutral wire 47-V3. One end of the first V-phase neutral wire 47-V1 is electrically connected to the first V-phase winding wire 46-V1. The one end of the first V-phase neutral wire 47-V1 is arranged on the first direction side of the fifth stator core tooth portion 32-5, and the other end thereof is arranged on the lead side compared to the fifth stator core tooth portion 32-5. One end of the second V-phase neutral wire 47-V2 is electrically connected to the second V-phase winding wire 46-V2. The one end of the second V-phase neutral wire 47-V2 is arranged on the first direction side of the second stator core tooth portion 32-2, and the other end thereof is arranged on the lead side compared to the second stator core tooth portion 32-2. One end of the third V-phase neutral wire 47-V3 is electrically connected to the third V-phase winding wire 46-V3. The one end of the third V-phase neutral wire 47-V3 is arranged on the first direction side of the fifth stator core tooth portion 32-5, and the other end thereof is arranged on the lead side compared to the fifth stator core tooth portion 32-5.

The plurality of W-phase neutral wires 47-W1 to 47-W3 include a first W-phase neutral wire 47-W1, a second W-phase neutral wire 47-W2, and a third W-phase neutral wire 47-W3. One end of the first W-phase neutral wire 47-W1 is electrically connected to the first W-phase winding wire 46-W1. The one end of the first W-phase neutral wire 47-W1 is arranged on the first direction side of the sixth stator core tooth portion 32-6, and the other end thereof is arranged on the lead side compared to the sixth stator core tooth portion 32-6. One end of the second W-phase neutral wire 47-W2 is electrically connected to the second W-phase winding wire 46-W2. The one end of the second W-phase neutral wire 47-W2 is arranged on the first direction side of the ninth stator core tooth portion 32-9, and the other end thereof is arranged on the lead side compared to the ninth stator core tooth portion 32-9. One end of the third W-phase neutral wire 47-W3 is electrically connected to the third W-phase winding wire 46-W3. The one end of the third W-phase neutral wire 47-W3 is arranged on the first direction side of the third stator core tooth portion 32-3, and the other end thereof is arranged on the lead side compared to the third stator core tooth portion 32-3.

The stator 22 further includes a plurality of U-phase power wires 48-U1 to 48-U3, a plurality of V-phase power wires 48-V1 to 48-V3, and a plurality of W-phase power wires 48-W1 to 48-W3.

One ends of the plurality of U-phase power wires 48-U1 to 48-U3 are arranged on the lead side of the first stator core tooth portion 32-1, and the one ends are arranged on a second direction side (right side in FIG. 6) of the first stator core tooth portion 32-1. The other end of a first U-phase power wire 48-U1 is electrically connected to the first U-phase winding wire 46-U1. The other end of a second U-phase power wire 48-U2 is electrically connected to the second U-phase winding wire 46-U2. The other end of a third U-phase power wire 48-U3 is electrically connected to the third U-phase winding wire 46-U3.

A part of the first U-phase power wire 48-U1 further passes through the plurality of slits 44 in the outer peripheral wall portion 41 of the lower insulator 25, and includes a first U-phase connecting wire portion 49-U1. The first U-phase connecting wire portion 49-U1 that is a part of the first U-phase power wire 48-U1, is arranged along an outer peripheral surface of the outer peripheral wall portion 41 of the lower insulator 25. A part of the second U-phase power wire 48-U2 further passes through the plurality of slits 44 in the outer peripheral wall portion 41 of the lower insulator 25, and includes a second U-phase connecting wire portion 49-U2. The second U-phase connecting wire portion 49-U2 that is a part of the second U-phase power wire 48-U2, is arranged along the outer peripheral surface of the outer peripheral wall portion 41 of the lower insulator 25.

One ends of the plurality of V-phase power wires 48-V1 to 48-V3 are arranged on the lead side of the fifth stator core tooth portion 32-5, and the one ends are arranged on the second direction side of the fifth stator core tooth portion 32-5. The other end of a first V-phase power wire 48-V1 is electrically connected to the first V-phase winding wire 46-V1. The other end of a second V-phase power wire 48-V2 is electrically connected to the second V-phase winding wire 46-V2. The other end of a third V-phase power wire 48-V3 is electrically connected to the third V-phase winding wire 46-V3.

A part of the first V-phase power wire 48-V1 further passes through the plurality of slits 44 in the outer peripheral wall portion 41 of the lower insulator 25, and includes a first V-phase connecting wire portion 49-V1. The first V-phase connecting wire portion 49-V1 that is a part of the first V-phase power wire 48-V1, is arranged along the outer peripheral surface of the outer peripheral wall portion 41 of the lower insulator 25. A part of the second V-phase power wire 48-V2 further passes through the plurality of slits 44 in the outer peripheral wall portion 41 of the lower insulator 25, and includes a second V-phase connecting wire portion 49-V2. The second V-phase connecting wire portion 49-V2 that is a part of the second V-phase power wire 48-V2, is arranged along the outer peripheral surface of the outer peripheral wall portion 41 of the lower insulator 25.

One ends of the plurality of W-phase power wires 48-W1 to 48-W3, are arranged on the lead side of the third stator core tooth portion 32-3, and the one ends thereof are arranged on the second direction side of the third stator core tooth portion 32-3. The other end of a first W-phase power wire 48-W1 is electrically connected to the first W-phase winding wire 46-W1. The other end of a second W-phase power wire 48-W2 is electrically connected to the second W-phase winding wire 46-W2. The other end of a third W-phase power wire 48-W3 is electrically connected to the third W-phase winding wire 46-W3.

A part of the first W-phase power wire 48-W1 further passes through the plurality of slits 44 in the outer peripheral wall portion 41 of the lower insulator 25, and includes a first W-phase connecting wire portion 49-W1. The first W-phase connecting wire portion 49-W1 that is a part of the first W-phase power wire 48-W1, is arranged along the outer peripheral surface of the outer peripheral wall portion 41 of the lower insulator 25. A part of the second W-phase power wire 48-W2 further passes through the plurality of slits 44 in the outer peripheral wall portion 41 of the lower insulator 25, and includes a second W-phase connecting wire portion 49-W2. The second W-phase connecting wire portion 49-W2 that is a part of the second W-phase power wire 48-W2, is arranged along the outer peripheral surface of the outer peripheral wall portion 41 of the lower insulator 25.

Figure 7:
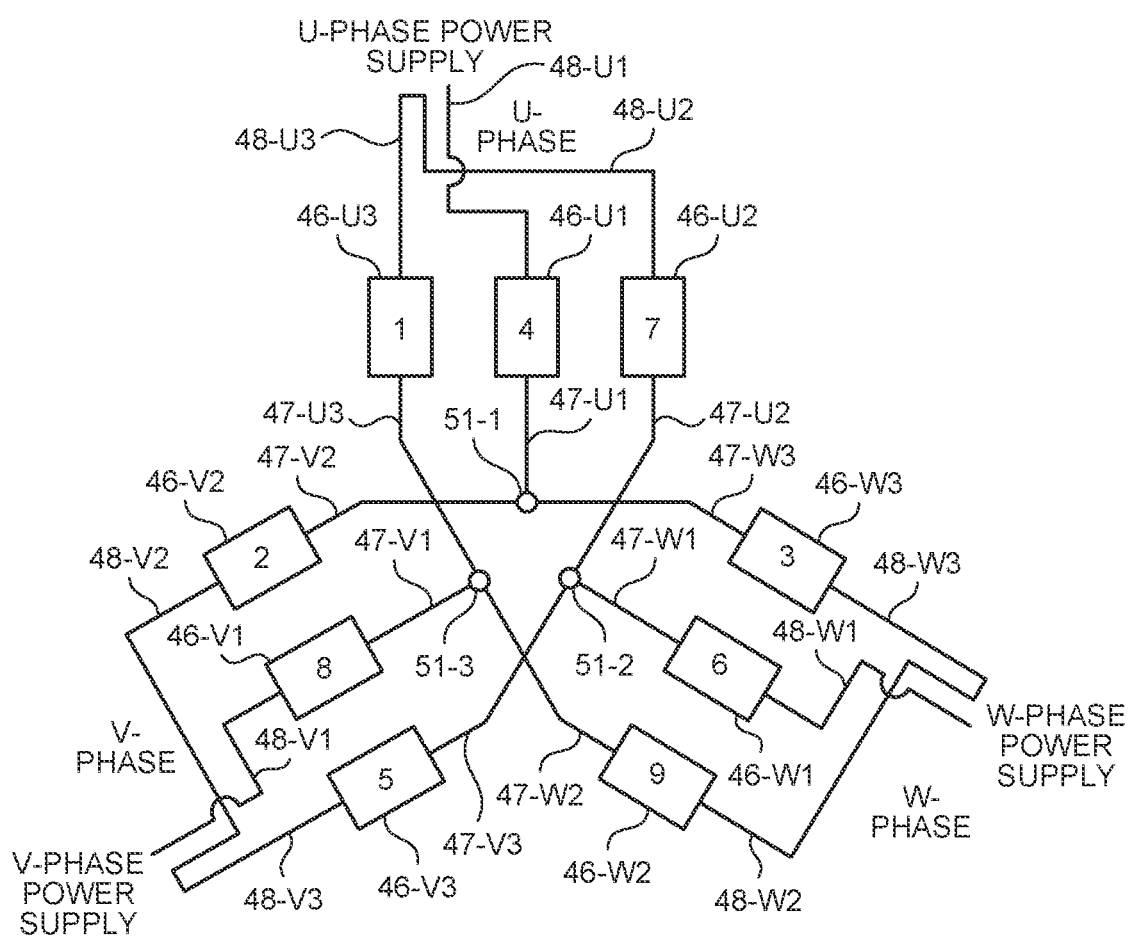
FIG. 7 is a connection wiring diagram illustrating a connection state of the plurality of winding wires in the embodiment.

FIG. 7 is a connection wiring diagram illustrating a connection state of the plurality of winding wires 46 in the embodiment. The three-phase motor in the embodiment is a motor having a star connection, in which the winding wires 46 are connected in parallel. The stator 22 further includes a plurality of neutral points as illustrated in FIG. 7. The plurality of neutral points are arranged on the lead side of the plurality of stator core tooth portions 32-1 to 32-9, and include a first neutral point 51-1, a second neutral point 51-2, and a third neutral point 51-3. The first neutral point 51-1, the second neutral point 51-2, and the third neutral point 51-3 are electrically insulated from each other.

One end of the first U-phase winding wire 46-U1 is electrically connected to the first neutral point 51-1 via the first U-phase neutral wire 47-U1, and the other end thereof is electrically connected to a U-phase power supply via the first U-phase power wire 48-U1. One end of the second U-phase winding wire 46-U2 is electrically connected to the second neutral point 51-2 via the second U-phase neutral wire 47-U2, and the other end thereof is electrically connected to the U-phase power supply via the second U-phase power wire 48-U2. One end of the third U-phase winding wire 46-U3 is electrically connected to the third neutral point 51-3 via the third U-phase neutral wire 47-U3, and the other end thereof is electrically connected to the U-phase power supply via the third U-phase power wire 48-U3.

One end of the first V-phase winding wire 46-V1 is electrically connected to the third neutral point 51-3 via the first V-phase neutral wire 47-V1, and the other end thereof is electrically connected to a V-phase power supply via the first V-phase power wire 48-V1. One end of the second V-phase winding wire 46-V2 is electrically connected to the first neutral point 51-1 via the second V-phase neutral wire 47-V2, and the other end thereof is electrically connected to the V-phase power supply via the second V-phase power wire 48-V2. One end of the third V-phase winding wire 46-V3 is electrically connected to the second neutral point 51-2 via the third V-phase neutral wire 47-V3, and the other end thereof is electrically connected to the V-phase power supply via the third V-phase power wire 48-V3.

One end of the first W-phase winding wire 46-W1 is electrically connected to the second neutral point 51-2 via the first W-phase neutral wire 47-W1, and the other end thereof is electrically connected to a W-phase power supply via the first W-phase power wire 48-W1. One end of the second W-phase winding wire 46-W2 is electrically connected to the third neutral point 51-3 via the second W-phase neutral wire 47-W2, and the other end thereof is electrically connected to the W-phase power supply via the second W-phase power wire 48-W2. One end of the third W-phase winding wire 46-W3 is electrically connected to the first neutral point 51-1 via the third W-phase neutral wire 47-W3, and the other end thereof is electrically connected to the W-phase power supply via the third W-phase power wire 48-W3.

[Manufacturing Method of Stator]

U-phase electric wires, V-phase electric wires, and W-phase electric wires are properly arranged, by a winding machine, in the stator core 23 on which the upper insulator 24 and the lower insulator 25 are properly mounted, whereby the stator 22 is manufactured. An electric wire is, for example, an enamel wire (electric wire that is a copper wire coated with an enamel coat). The winding machine includes, for example, a nozzle for a U-phase electric wire, a nozzle for a V-phase electric wire, and a nozzle for a W-phase electric wire. The nozzle for a U-phase electric wire, the nozzle for a V-phase electric wire, and the nozzle for a W-phase electric wire are fixed to each other. When the nozzle for a U-phase electric wire is properly moved, a U-phase electric wire can be arranged in a predetermined position relative to the stator core 23. When the nozzle for a V-phase electric wire is properly moved, a V-phase electric wire can be arranged in a predetermined position relative to the stator core 23. When the nozzle for a W-phase electric wire is properly moved, a W-phase electric wire can be arranged in a predetermined position relative to the stator core 23. Note that the winding machine is not limited to a configuration of the present embodiment, and what includes only one nozzle may be used.

First, the stator core 23, to which the upper insulator 24, the lower insulator 25, and an insulating film (not illustrated) are properly mounted, is set in the winding machine. By moving the nozzle for a U-phase electric wire properly, the winding machine arranges one end of a U-phase electric wire on the lead side of the first stator core tooth portion 32-1, and causes the U-phase electric wire to pass through one of the plurality of slits 44 along the second direction side of the first stator core tooth portion 32-1. Then, by moving the nozzle for a U-phase electric wire properly and arranging the U-phase electric wire along the outer peripheral surface of the outer peripheral wall portion 41 of the lower insulator 25, the winding machine forms the first U-phase connecting wire portion 49-U1 from the U-phase electric wire. By further moving the nozzle for a U-phase electric wire properly and arranging the U-phase electric wire from the one of the plurality of slits 44 to the fourth stator core tooth portion 32-4, the winding machine forms the first U-phase power wire 48-U1 from the U-phase electric wire. At this time, the winding machine forms the first V-phase power wire 48-V1 from a V-phase electric wire, and forms the first W-phase power wire 48-W1 from a W-phase electric wire by moving the nozzle for a V-phase electric wire and the nozzle for a W-phase electric wire in synchronization with the nozzle for a U-phase electric wire.

Next, by moving the nozzle for a U-phase electric wire properly and winding the U-phase electric wire counterclockwise around the fourth stator core tooth portion 32-4, the winding machine forms the first U-phase winding wire 46-U1 from the U-phase electric wire. At this time, by moving the nozzle for a V-phase electric wire in synchronization with the nozzle for a U-phase electric wire, the winding machine winds the V-phase electric wire counterclockwise around the eighth stator core tooth portion 32-8, and forms the first V-phase winding wire 46-V1 from the V-phase electric wire. By moving the nozzle for a W-phase electric wire in synchronization with the nozzle for a U-phase electric wire, the winding machine winds the W-phase electric wire counterclockwise around the sixth stator core tooth portion 32-6, and forms the first W-phase winding wire 46-W1 from the W-phase electric wire.

Next, by moving the nozzle for a U-phase electric wire properly and arranging the U-phase electric wire from the first direction side of the fourth stator core tooth portion 32-4 to the lead side of the fourth stator core tooth portion 32-4, the winding machine forms the first U-phase neutral wire 47-U1 from the U-phase electric wire. At this time, the winding machine forms the first V-phase neutral wire 47-V1 from the V-phase electric wire, and forms the first W-phase neutral wire 47-W1 from the W-phase electric wire by moving the nozzle for a V-phase electric wire and the nozzle for a W-phase electric wire in synchronization with the nozzle for a U-phase electric wire.

Next, by moving the nozzle for a U-phase electric wire properly and arranging the U-phase electric wire from the lead side of the seventh stator core tooth portion 32-7 to the first direction side of the seventh stator core tooth portion 32-7, the winding machine forms the second U-phase neutral wire 47-U2 from the U-phase electric wire. At this time, the winding machine forms the second V-phase neutral wire 47-V2 from the V-phase electric wire, and forms the second W-phase neutral wire 47-W2 from the W-phase electric wire by moving the nozzle for a V-phase electric wire and the nozzle for a W-phase electric wire in synchronization with the nozzle for a U-phase electric wire.

Next, by moving the nozzle for a U-phase electric wire properly and winding the U-phase electric wire clockwise around the seventh stator core tooth portion 32-7, the winding machine forms the second U-phase winding wire 46-U2 from the U-phase electric wire. At this time, by moving the nozzle for a V-phase electric wire in synchronization with the nozzle for a U-phase electric wire, the winding machine winds the V-phase electric wire clockwise around the second stator core tooth portion 32-2, and forms the second V-phase winding wire 46-V2 from the V-phase electric wire. By moving the nozzle for a W-phase electric wire in synchronization with the nozzle for a U-phase electric wire, the winding machine winds the W-phase electric wire clockwise around the ninth stator core tooth portion 32-9, and forms the second W-phase winding wire 46-W2 from the W-phase electric wire.

Then, by moving the nozzle for a U-phase electric wire properly and causing the U-phase electric wire to be arranged along the outer peripheral surface of the outer peripheral wall portion 41 through one of the plurality of slits 44, the winding machine forms the second U-phase connecting wire portion 49-U2 from the U-phase electric wire. By further moving the nozzle for a U-phase electric wire properly and arranging the U-phase electric wire on the lead side of the first stator core tooth portion 32-1 through one of the plurality of slits 44, the winding machine forms the second U-phase power wire 48-U2 from the U-phase electric wire. At this time, the winding machine forms the second V-phase power wire 48-V2 from the V-phase electric wire, and forms the second W-phase power wire 48-W2 from the W-phase electric wire by moving the nozzle for a V-phase electric wire and the nozzle for a W-phase electric wire in synchronization with the nozzle for a U-phase electric wire.

Next, by moving the nozzle for a U-phase electric wire properly and arranging the U-phase electric wire from the lead side of the first stator core tooth portion 32-1 to the second direction side of the first stator core tooth portion 32-1, the winding machine forms the third U-phase power wire 48-U3 from the U-phase electric wire. At this time, the winding machine forms the third V-phase power wire 48-V3 from the V-phase electric wire, and forms the third W-phase power wire 48-W3 from the W-phase electric wire by moving the nozzle for a V-phase electric wire and the nozzle for a W-phase electric wire in synchronization with the nozzle for a U-phase electric wire. Also, a first connection terminal 50-1 is connected to one end, at which the plurality of U-phase power wires 48-U1 to 48-U3 are bundled, a second connection terminal 50-2 is connected to one end, at which the plurality of V-phase power wires 48-V1 to 48-V3 are bundled, and a third connection terminal 50-3 is connected to one end, at which the plurality of W-phase power wires 48-W1 to 48-W3 are bundled (see FIG. 2).

Next, by moving the nozzle for a U-phase electric wire properly and winding the U-phase electric wire counterclockwise around the first stator core tooth portion 32-1, the winding machine forms the third U-phase winding wire 46-U3 from the U-phase electric wire. At this time, by moving the nozzle for a V-phase electric wire in synchronization with the nozzle for a U-phase electric wire, the winding machine winds the V-phase electric wire counterclockwise around the fifth stator core tooth portion 32-5, and forms the third V-phase winding wire 46-V3 from the V-phase electric wire. By moving the nozzle for a W-phase electric wire in synchronization with the nozzle for a U-phase electric wire, the winding machine winds the W-phase electric wire counterclockwise around the third stator core tooth portion 32-3, and forms the third W-phase winding wire 46-W3 from the W-phase electric wire.

Next, by moving the nozzle for a U-phase electric wire properly and arranging the U-phase electric wire from the first direction side of the first stator core tooth 15 portion 32-1 to the lead side of the first stator core tooth portion 32-1, the winding machine forms the third U-phase neutral wire 47-U3 from the U-phase electric wire. At this time, the winding machine forms the third V-phase neutral wire 47-V3 from the V-phase electric wire, and forms the third W-phase neutral wire 47-W3 from the W-phase electric wire by moving the nozzle for a V-phase electric wire and the nozzle for a W-phase electric wire in synchronization with the nozzle for a U-phase electric wire.

By being wound in the above manner, both of a winding start portion and a winding end portion of the third U-phase winding wire 46-U3, are arranged on the lead side as illustrated in FIG. 6 and FIG. 7. On the other hand, winding of the first U-phase winding wire 46-U1 and the second U-phase winding wire 46-U2, is started from an opposite side of the lead, and the winding is ended on the lead side. Thus, the number of turns, in which the third U-phase winding wire 46-U3 is wound, is different from the number of turns, in which the first U-phase winding wire 46-U1 is wound, and from the number of turns, in which the second U-phase winding wire 46-U2 is wound. Also, the first U-phase winding wire 46-U1 and the second U-phase winding wire 46-U2 have different lengths, in which the U-phase power wire connected to the U-phase power supply is routed. In other words, ways of winding, which includes the number of turns of a winding wire and a length of a power wire, of the first U-phase winding wire 46-U1 to the third U-phase winding wire 46-U3, are different. Thus, a length of an electric wire from the neutral point 51-1 to the U-phase power wire, is different in the first U-phase winding wire 46-U1, the second U-phase winding wire 46-U2, and the third U-phase winding wire 46-U3, and impedance thereof is also different.

The first U-phase neutral wire 47-U1 and the second U-phase neutral wire 47-U2 are separated, the first V-phase neutral wire 47-V1 and the second V-phase neutral wire 47-V2 are separated, and the first W-phase neutral wire 47-W1 and the second W-phase neutral wire 47-W2 are separated. An end of the first U-phase neutral wire 47-U1, an end of the second V-phase neutral wire 47-V2, and an end of the third W-phase neutral wire 47-W3, are electrically connected by a connector that can electrically connect a plurality of winding wires without peeling off coats of electric wires (hereinafter, referred to as connector).

Figure 8:
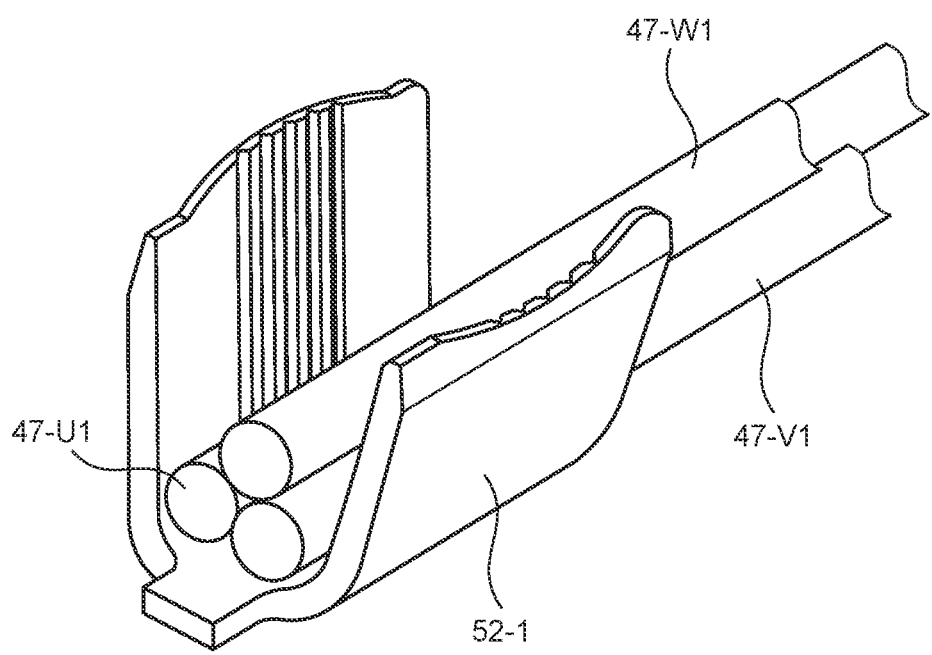
FIG. 8 is a perspective view illustrating a state before connection between a first splice terminal and an electric wire in the embodiment.

For example, a first splice terminal 52-1 in a manner illustrated in FIG. 8 is used as a connecting member. FIG. 8 is a perspective view illustrating a state before connection between the first splice terminal 52-1 and electric wires in the embodiment. In the present embodiment, an end of the first U-phase neutral wire 47-U1, an end of the second V-phase neutral wire 47-V2, and an end of the third W-phase neutral wire 47-W3, are electrically connected to each other by being joined to each other by crimping via the first splice terminal 52-1, whereby the first neutral point 51-1 is formed. As illustrated in FIG. 8, the three electric wires (neutral wires) are stably bundled in a state of being in contact with each other. The first splice terminal 52-1 as a connecting member can electrically connect the three electric wires to each other by performing joining thereof by crimping in such a manner as to wrap the bundled electric wires. When an electric wire group is crimped by the first splice terminal 52-1, a coating film of each electric wire is peeled off by an uneven portion of the first splice terminal 52-1, and the three electric wires are joined. Note that the number of electric wires bundled by the connecting member, is not limited to three. That is, as long as electric wires can be joined to each other by crimping and electrically connected to each other, the number of bundled wires is not limited.

Similarly, an end of the second U-phase neutral wire 47-U2, an end of the third V-phase neutral wire 47-V3, and an end of the first W-phase neutral wire 47-W1, are electrically connected to each other by being joined to each other by crimping via a second splice terminal 52-2, whereby the second neutral point 51-2 is formed. The end of the third U-phase neutral wire 47-U3, the end of the first V-phase neutral wire 47-V1, and the end of the second W-phase neutral wire 47-W2, are electrically connected to each other by being joined to each other by crimping by a third splice terminal 52-3, whereby the third neutral point 51-3 is formed. As a result, the first neutral point 51-1, the second neutral point 51-2, and the third neutral point 51-3, can be easily formed.

[Operation of Compressor]

The compressor 1 is provided as a component of a refrigeration cycle device (not illustrated), and is used to compress a refrigerant and circulate the refrigerant in a refrigerant circuit of the refrigeration cycle device. The three-phase motor 6 generates a rotating magnetic field when a three-phase voltage is applied to each of the plurality of U-phase power wires 48-U1 to 48-U3, the plurality of V-phase power wires 48-V1 to 48-V3, and the plurality of W-phase power wires 48-W1 to 48-W3. The rotor 21 is rotated by the rotating magnetic field generated by the stator 22. The three-phase motor 6 rotates the shaft 3 by the rotation of the rotor 21.

The compression unit 5 sucks low-pressure refrigerant gas through the suction pipe 11 by the rotation of the shaft 3, generates high-pressure refrigerant gas by compressing the sucked low-pressure refrigerant gas, and supplies the high-pressure refrigerant gas to the upper muffler chamber 16 and the lower muffler chamber 17. The lower muffler cover 15 reduces a pulsation of the pressure of the high-pressure refrigerant gas supplied to the lower muffler chamber 17, and supplies the high-pressure refrigerant gas with a reduced pressure pulsation to the upper muffler chamber 16. The upper muffler cover 14 reduces a pulsation of the pressure of the high-pressure refrigerant gas supplied to the upper muffler chamber 16, and supplies the high-pressure refrigerant gas with a reduced pressure pulsation to a space between the compression unit 5 and the three-phase motor 6 in the internal space 7 through the compressed refrigerant discharge hole 18.

The high-pressure refrigerant gas supplied to the space between the compression unit 5 and the three-phase motor 6 in the internal space 7, passes through a gap formed in the three-phase motor 6, and is supplied to a space above the three-phase motor 6 in the internal space 7. The refrigerant, which is supplied to the space above the three-phase motor 6 in the internal space 7, is discharged through the discharge pipe 12 to a device, which is arranged on a downstream side of the compressor 1 in the refrigeration cycle device.

[Characteristic Configuration of Compressor]

Next, a characteristic configuration of the three-phase motor 6 in the embodiment will be described. As described above, the three U-phase neutral wires 47-U1 to 47-U3, the three V-phase neutral wires 47-V1 to 47-V3, and the three W-phase neutral wires 47-W1 to 47-W3 (hereinafter, also referred to as neutral wire 47), are respectively connected at the neutral points 51-1 to 51-3 (hereinafter, also referred to as neutral point 51). The characteristics of the present embodiment include a mounting structure of nine neutral wires 47 drawn from an outer side to an inner side of the upper insulator 24.

Figure 9:
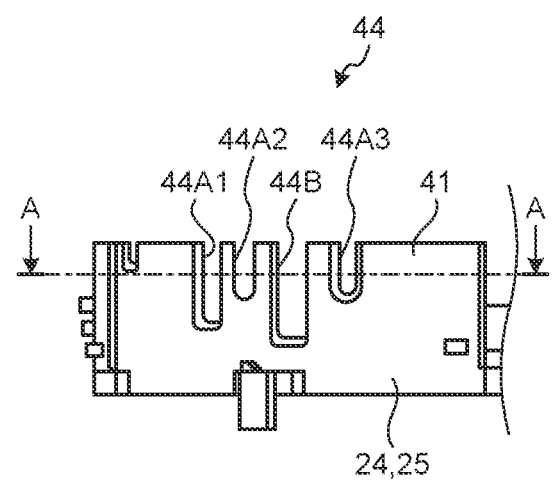
FIG. 9 is a side view illustrating a main part of the upper insulator in the embodiment.
Figure 10:
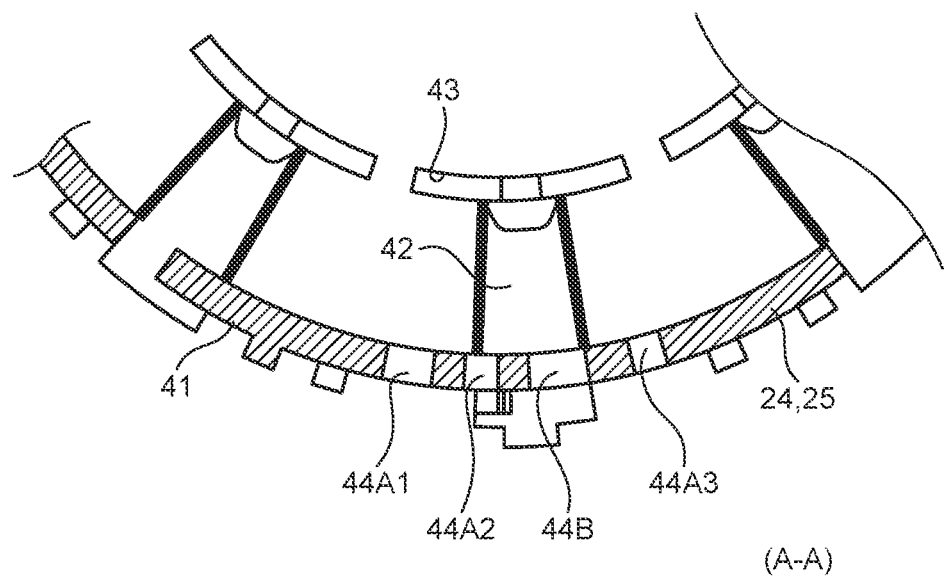
FIG. 10 is a sectional view taken along line A-A illustrating the main part of the upper insulator in the embodiment.

FIG. 9 is a side view illustrating a main part of the upper insulator 24 in the embodiment. FIG. 10 is a sectional view taken along line A-A illustrated in FIG. 10, illustrating the main part of the upper insulator 24 in the embodiment. As illustrated in FIGS. 9 and 10, in the outer peripheral wall portion 41 of the upper insulator 24 in which the plurality of insulator tooth portions 42-1 to 42-9 (42) and a plurality of flange portions 43-1 to 43-9 (43) are formed, a plurality of slits 44 are formed by cutting the outer peripheral wall portion 41 from an upper end of the outer peripheral wall portion 41 along an axial direction of the shaft 3.

The plurality of slits 44 include a first drawing slit 44A1, a second drawing slit 44A2, and a third drawing slit 44A3, as drawing notches through which three sets of neutral wires 47 are drawn from the outer side to the inner side of the upper insulator 24. The first drawing slit 44A1, the second drawing slit 44A2, and the third drawing slit 44A3 are provided in such a manner as to penetrate from the outer side to the inner side of the outer peripheral wall portion 41 of the upper insulator 24, and are arranged close to each other in a circumferential direction of the outer peripheral wall portion 41.

Every three neutral wires 47 of the nine neutral wires 47 are routed along the outer peripheral surface of the outer peripheral wall portion 41 as a set of neutral wires 47, and are drawn from the outer side to the inner side of the outer peripheral wall portion 41 through each of the first drawing slit 44A1, the second drawing slit 44A2, and the third drawing slit 44A3, and the three neutral wires 47 drawn are fixed to each other only on the inner side of the outer peripheral wall portion 41. The three neutral wires 47, which are drawn from the outer side to the inner side of the outer peripheral wall portion 41 of the upper insulator 24, are twisted with each other on the inner side of the outer peripheral wall portion 41, whereby the three neutral wires 47 are fixed to each other and bundled.

As described above, since the nine neutral wires 47 are individually fixed as three sets of neutral wires 47, the neutral wires 47 are easily handled, the workability in assembling of the three-phase motor 6 is improved, and efficiency of assembling work is improved. Furthermore, since the three sets of neutral wires 47 are twisted and fixed only on the inner side of the outer peripheral wall portion 41 of the upper insulator 24, portions twisted to fix the three neutral wires 47 to each other do not occur on the outer side of the outer peripheral wall portion 41. Therefore, a distance between the neutral wires 47 drawn along the outer peripheral surface of the outer peripheral wall portion 41 and the container 2 is appropriately secured, and the insulation distance of the neutral wire 47 can be easily secured. In addition, since the three sets of neutral wires 47 pass through the respective drawing slits 44A without being twisted with each other on the outer side of the upper insulator 24, it is possible to smoothly drawing the neutral wires 47 from the outer side to the inner side of the upper insulator 24 in a state where the movement of the neutral wires 47 is not restricted, such that the neutral wires 47 can be easily handled.

Further, the plurality of slits 44 include a pull-out slit 44B as a pull-out notch for pulling out at least one set of neutral wires 47 among the three sets of neutral wires 47 that are fixed to each other with three neutral wires 47 each on the inner side of the outer peripheral wall portion 41 from the inner side to the outer side of the outer peripheral wall portion 41 of the upper insulator 24. The pull-out slit 44B is not used in the present embodiment, but is used in a manufacturing process of the stator 22 in another embodiment to be described later.

The pull-out slit 44B is provided in such a manner as to penetrate from the inner side to the outer side of the outer peripheral wall portion 41. The pull-out slit 44B is arranged close to the first drawing slit 44A1, the second drawing slit 44A2, and the third drawing slit 44A3 in the circumferential direction of the outer peripheral wall portion 41. The pull-out slit 44B is arranged between, for example, the second drawing slit 44A2 and the third drawing slit 44A3 in the circumferential direction of the outer peripheral wall portion 41. Further, the width of the pull-out slit 44B with respect to the circumferential direction of the outer peripheral wall portion 41, is larger than the width of each of the first drawing slit 44A1, the second drawing slit 44A2, and the third drawing slit 44A3, and is a width that allows the three sets of neutral wires 47 to pass through the pull-out slit 44B.

Similarly to the upper insulator 24, the lower insulator 25 may also be provided with the first drawing slit 44A1, the second drawing slit 44A2, the third drawing slit 44A3, and the pull-out slit, and may have a common shape with the upper insulator 24.

As described above, in the nine neutral wires 47 in the present embodiment, the three sets of neutral wires 47 connected at the three neutral points 51, respectively, are twisted with each other only on the inner side of the outer peripheral wall portion 41 of the upper insulator 24, and individually bundled. Further, the three sets of neutral wires 47 are twisted with each other on the inner side of the outer peripheral wall portion 41 of the upper insulator 24 to be bundled. Each of neutral point 51 sides of the three sets of neutral wires 47 bundled, is covered with an insulating tube 58 that is an insulating member, and is inserted into a gap G between winding portions 45 adjacent in a circumferential direction of the stator 22 (rotational direction of the rotor 21) (see FIG. 2).

[Main Part of Stator Manufacturing Process]

Figure 11:
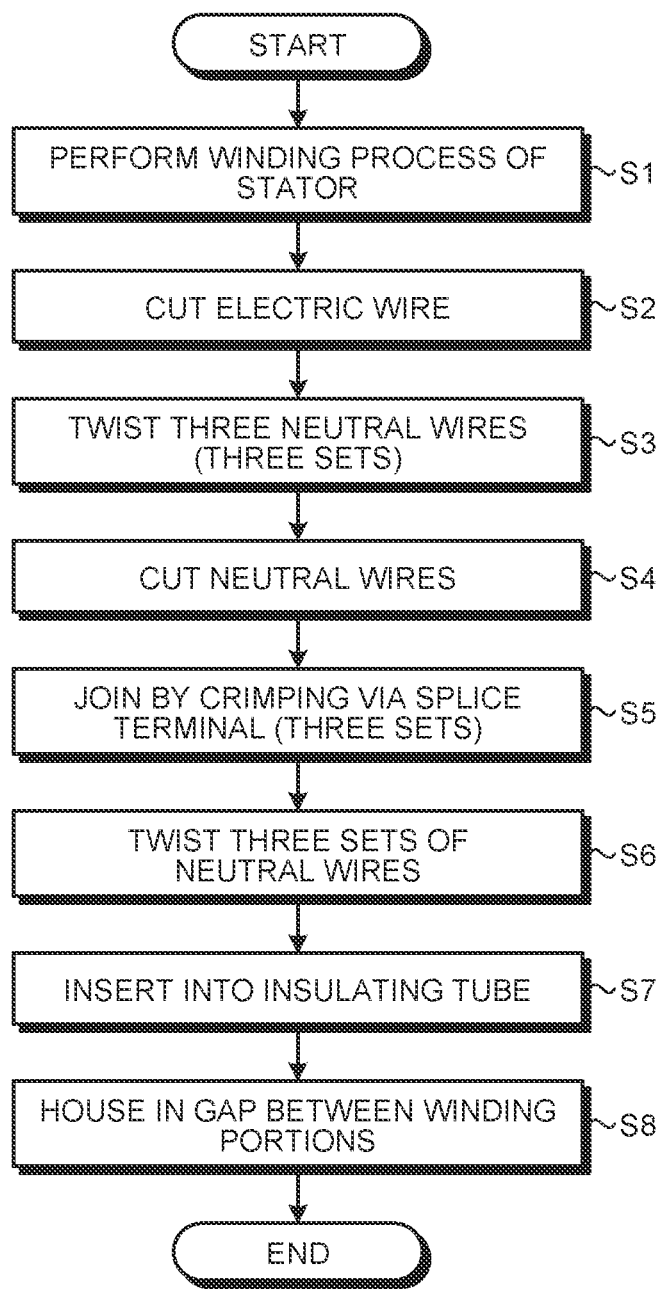
FIG. 11 is a flowchart for describing a manufacturing process of the stator in the embodiment.

A main part of the manufacturing process of the stator 22 of the three-phase motor 6 will be described. FIG. 11 is a flowchart for describing the manufacturing process of the stator 22 in the embodiment. As illustrated in FIG. 11, a winding process of the stator 22 is performed in the above manner (Step S1), whereby each winding wire 46 is formed. Each electric wire, which is supplied from a side of each nozzle for an electric wire, is cut (Step S2), whereby one end (neutral wire 47) of each winding wire 46 is separated from the side of each nozzle for an electric wire.

Subsequently, among the neutral wires 47 for the respective winding wires 46, one U-phase neutral wire 47, one V-phase neutral wire 47, and one W-phase neutral wire 47 form one set, every three neutral wires 47 are routed along the outer peripheral surface of the outer peripheral wall portion 41 of the upper insulator 24, and three neutral wires 47 pass through each of the first drawing slit 44A1, the second drawing slit 44A2, and the third drawing slit 44A3 (hereinafter, also referred to as drawing slits 44A) of the outer peripheral wall portion 41, and are fixed to each other on the inner side of the outer peripheral wall portion 41 (in the present embodiment, when the three neutral wires 47 are bundled on the inner side of the outer peripheral wall portion 41, portions of the neutral wires 47, which extend from the drawing slit 44A to the inner side of the outer peripheral wall portion 41, are twisted, such that the three neutral wires 47 are fixed to each other) (Step S3). In Step S3, among the nine neutral wires 47 respectively extended from nine winding portions 45, one set of three neutral wires 47 are drawn to the inner side of the outer peripheral wall portion 41 from the individual drawing slit 44A, and each of three sets of neutral wires 47 is individually twisted and fixed. Details of the process of individually twisting the three sets of neutral wires 47, will be described later.

Next, the three sets of neutral wires 47 respectively extended from the respective drawing slits 44A to the inner side of the outer peripheral wall portion 41 of the upper insulator 24, are cut at a predetermined length (Step S4), whereby lengths of the three sets of neutral wires 47 are made to be the same. Subsequently, the three sets of neutral wires 47 are respectively joined by crimping via the respective splice terminals 52 (52-1 to 52-3) (Step S5), whereby three neutral points 51 are formed. Subsequently, the three sets of neutral wires 47 are bundled, and the three sets of neutral wires 47 are fixed together (in the present embodiment, the three sets of neutral wires 47 are twisted together in a state of being bundled) (Step S6), whereby the three sets of neutral wires 47 are bundled. Details of the forming process of the neutral point 51, will be described later.

Next, the bundled neutral wires 47 are inserted into the insulating tube 58 (Step S7), whereby an insulation property of the entire neutral wires 47 extended from each of the winding portions 45, is secured. Finally, each of splice terminal 52 (neutral point 51) sides of the neutral wires 47 covered with the insulating tube 58, is housed into the gap G between adjacent winding portions 45 (Step S8).

[Process of Drawing Neutral Wire]

Figure 12A:
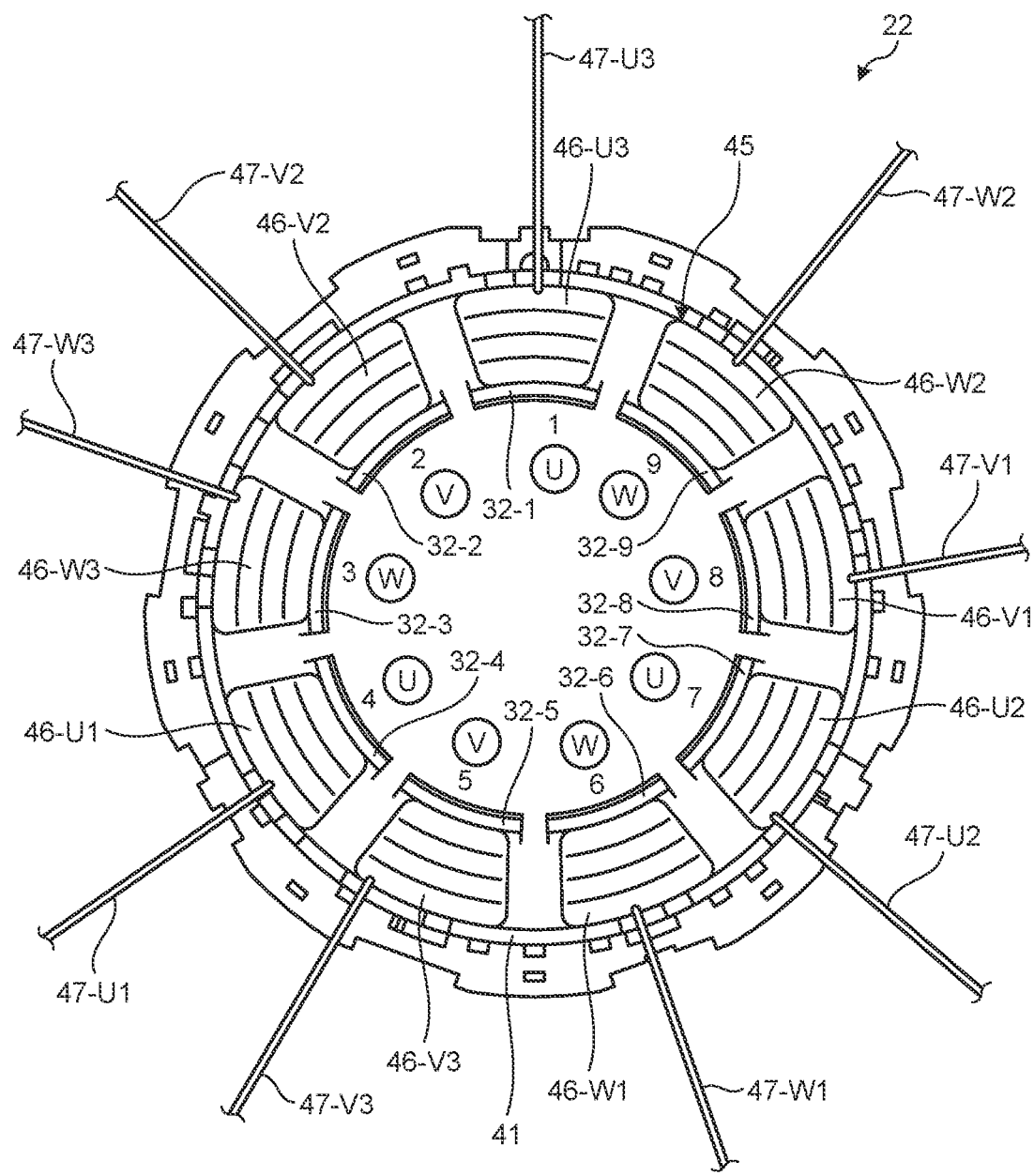
FIG. 12A is a plan view illustrating a state in which nine neutral wires are pulled out in the embodiment.
Figure 12B:
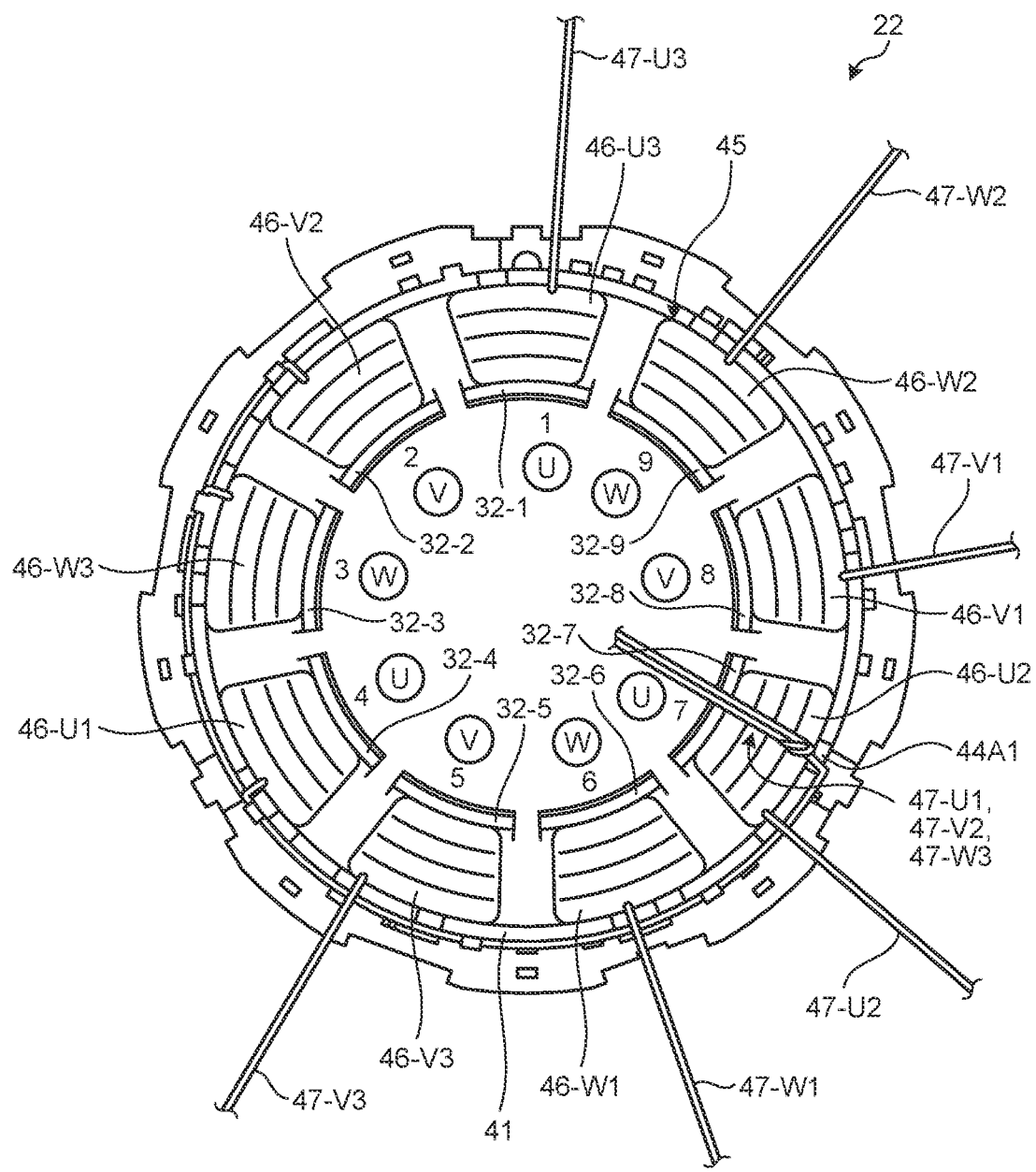
FIG. 12B is a plan view illustrating a state in which three neutral wires among nine neutral wires are drawn to an inner side of the upper insulator and fixed to each other in the embodiment.
Figure 12C:
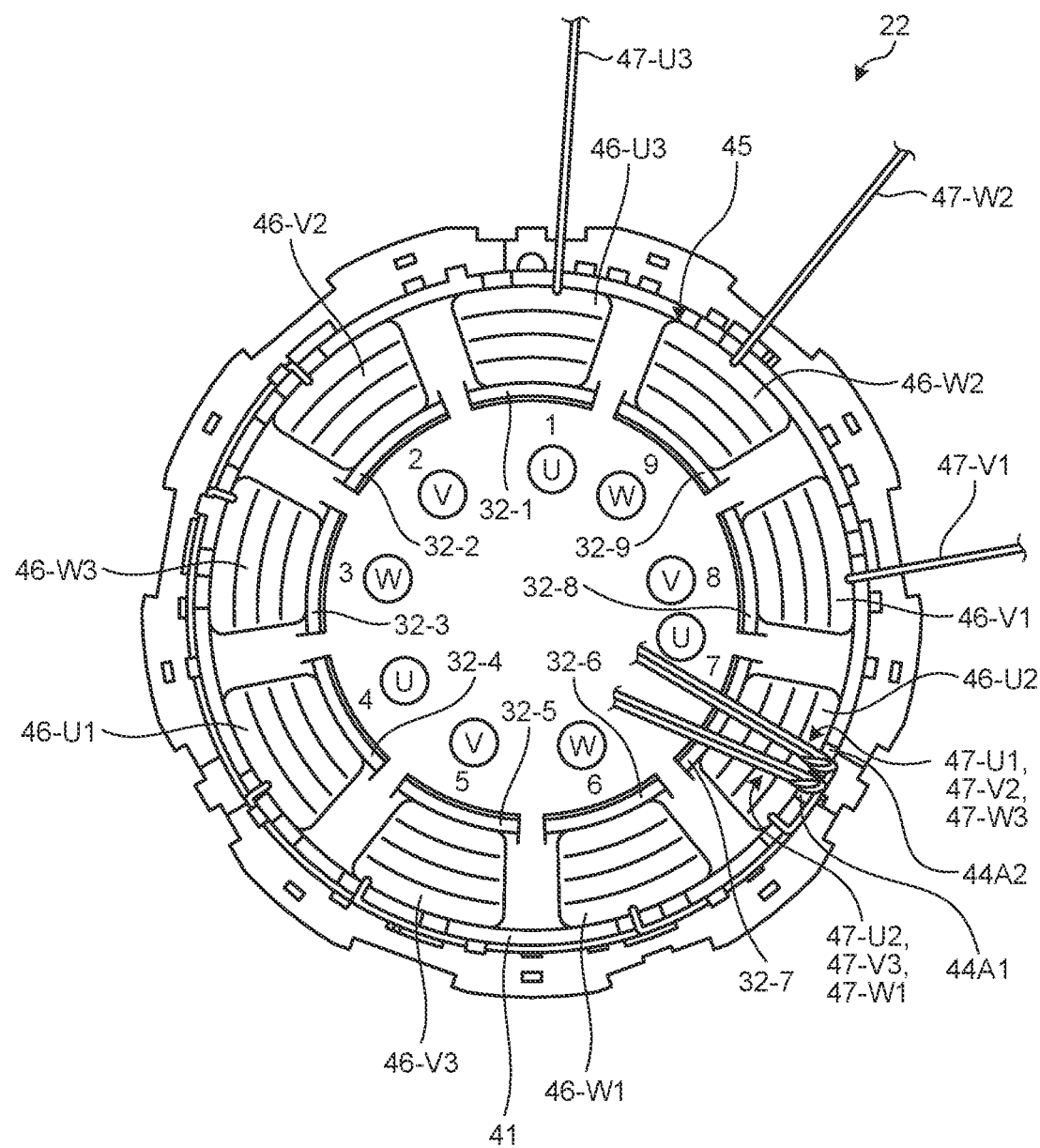
FIG. 12C is a plan view illustrating a state in which three neutral wires among the remaining six neutral wires are drawn to the inner side of the upper insulator and fixed to each other in the embodiment.
Figure 12D:
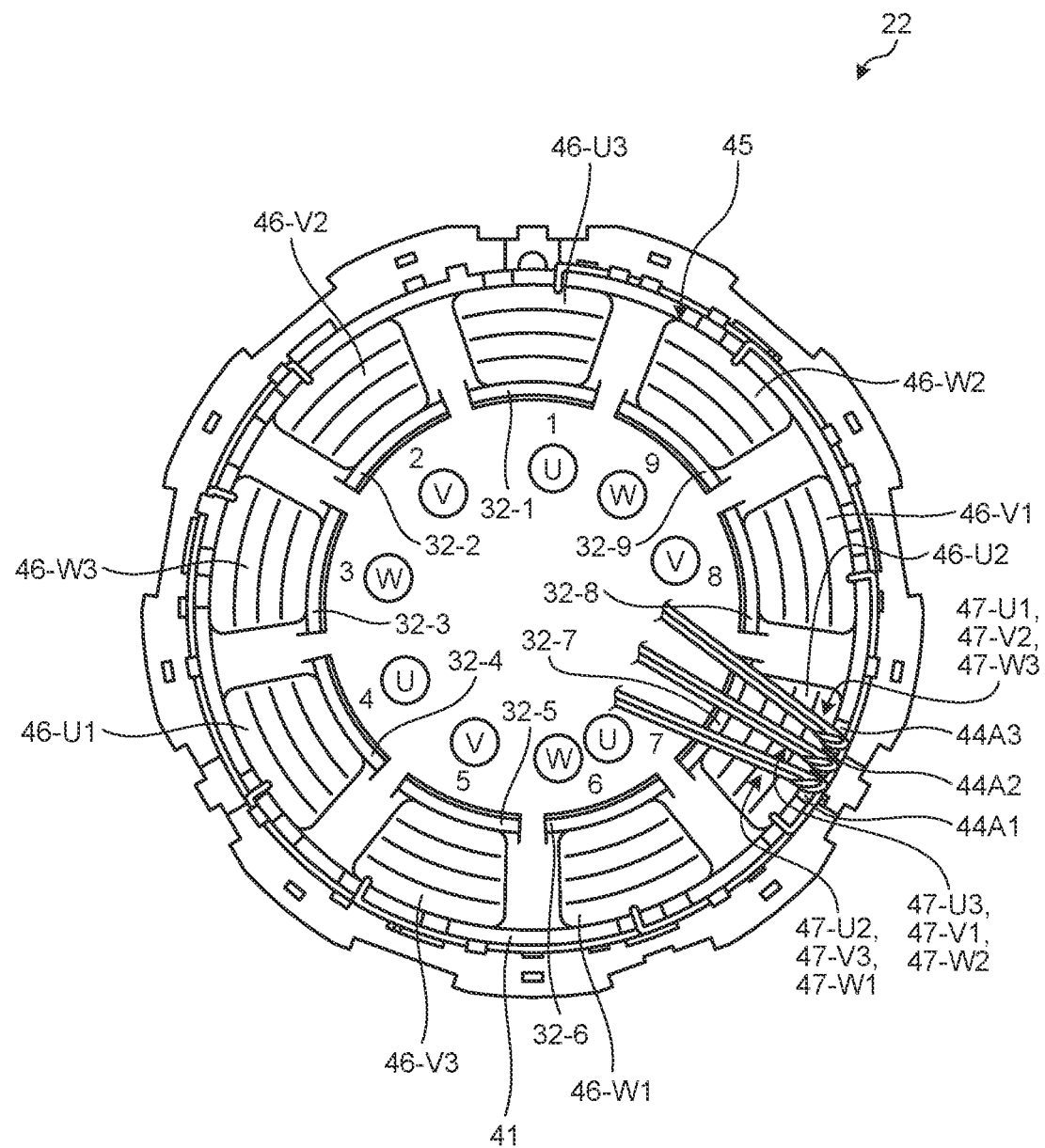
FIG. 12D is a plan view illustrating a state in which the remaining three neutral wires are drawn to the inner side of the upper insulator and fixed to each other in the example.

FIG. 12A is a plan view illustrating a state in which nine neutral wires 47 are pulled out in the embodiment. FIG. 12B is a plan view illustrating a state in which three neutral wires 47 among nine neutral wires 47 are drawn to the inner side of the upper insulator 24 and fixed to each other in the embodiment. FIG. 12C is a plan view illustrating a state in which three neutral wires 47 among the remaining six neutral wires 47 are drawn to the inner side of the upper insulator 24 and fixed to each other in the embodiment. FIG. 12D is a plan view illustrating a state in which the remaining three neutral wires 47 are drawn to the inner side of the upper insulator 24 and fixed to each other in the example. FIG. 12A to FIG. 12D are top views of the stator 22 viewed from a side of the upper insulator 24. The winding portions 45 that are nine slots, are numbered as 1 to 9 in counter-clockwise order. Note that, in FIGS. 12B to 12D, respective positions of the first drawing slit 44A1, the second drawing slit 44A2, and the third drawing slit 44A3 illustrated in FIGS. 9 and 10, are illustrated in a simplified manner.

As illustrated in FIG. 12A, nine neutral wires 47, which are three U-phase neutral wires 47-U1 to 47-U3, three V-phase neutral wires 47-V1 to 47-V3, and three W-phase neutral wires 47-W1 to 47-W3, are respectively pulled out from the winding portions 45 of the stator 22. First, as illustrated in FIGS. 12A and 12B, among the nine neutral wires 47, the V-phase neutral wire 47-V2, the W-phase neutral wire 47-W3, and the U-phase neutral wire 47-U1, which are respectively pulled out from second, third, and fourth winding portions 45 in the drawing, are routed along the outer peripheral surface of the upper insulator 24, and drawn from the outer side to the inner side of the outer peripheral wall portion 41 while passing through, for example, the first drawing slit 44A1 positioned in the vicinity of a seventh winding portion 45, and the three neutral wires 47 are twisted and fixed to each other only on the inner side of the outer peripheral wall portion 41. At this time, the V-phase neutral wire 47-V2 among the three neutral wires 47 is routed clockwise in the circumferential direction of the outer peripheral wall portion 41, the W-phase neutral wire 47-W3 and the U-phase neutral wire 47-U1 are routed counterclockwise, and the three neutral wires 47 are drawn to the inner side of the outer peripheral wall portion 41 from the first drawing slit 44A1.

That is, a neutral wire 47 routed toward one side in the circumferential direction of the upper insulator 24, and a neutral wire 47 routed toward the other side in the circumferential direction of the upper insulator 24, are twisted and fixed with each other after passing through the first drawing slit 44A1. The fixing work can be easily performed by setting the amount of twisting of the three neutral wires 47 to the extent that the three neutral wires 47 are bundled. In addition, the three neutral wires 47 pass through the first drawing slit 44A1 as described above and are thus locked in the first drawing slit 44A1, and the neutral wires 47 respectively extended to one side and the other side in the circumferential direction of the outer peripheral wall portion 41 of the upper insulator 24 are formed in such a manner as to be pulled against each other in the circumferential direction of the outer peripheral wall portion 41. Therefore, tension is applied to the neutral wire 47 extended from the winding portion 45 to the first drawing slit 44A1, and the neutral wire is stably fixed to the upper insulator 24.

Note that a neutral wire 47 routed clockwise and a neutral wire 47 routed counterclockwise among the three neutral wires 47, are not limited to the above combination of the paths of the neutral wires 47, and may be changed arbitrarily, for example, according to a position in which the drawing slit 44A is formed in the circumferential direction of the upper insulator 24. All of the three neutral wires 47 may be unidirectionally routed in the circumferential direction of the outer peripheral wall portion 41.

Subsequently, similarly to the three neutral wires 47 passing through the first drawing slit 44A1 and fixed to each other only on the inner side of the outer peripheral wall portion 41, as illustrated in FIGS. 12B and 12C, among the remaining six neutral wires 47, the V-phase neutral wire 47-V3, the W-phase neutral wire 47-W1, and the U-phase neutral wire 47-U2, which are respectively pulled out from fifth, sixth, and seventh winding portions 45 in the drawing, are routed along the outer peripheral surface of the upper insulator 24, and drawn from the outer side to the inner side of the outer peripheral wall portion 41 while passing through the second drawing slit 44A2 positioned in the vicinity of the seventh winding portion 45, and the three neutral wires 47 are twisted and fixed to each other only on the inner side of the outer peripheral wall portion 41. At this time, the V-phase neutral wire 47-V3 among the three neutral wires 47 is routed clockwise, the W-phase neutral wire 47-W1 and the U-phase neutral wire 47-U2 are routed counterclockwise, and the three neutral wires 47 are drawn to the inner side of the outer peripheral wall portion 41 from the second drawing slit 44A2.

Subsequently, similarly to the three neutral wires 47 passing through the second drawing slit 44A2 and fixed to each other only on the inner side of the outer peripheral wall portion 41, as illustrated in FIGS. 12C and 12D, among the remaining three neutral wires 47, the V-phase neutral wire 47-V1, the W-phase neutral wire 47-W2, and the U-phase neutral wire 47-U3, which are respectively pulled out from eighth, ninth, and first winding portions 45 in the drawing, are routed along the outer peripheral surface of the upper insulator 24, and drawn from the outer side to the inner side of the outer peripheral wall portion 41 while passing through the third drawing slit 44A3 positioned in the vicinity of the seventh winding portion 45, and the three neutral wires 47 are twisted and fixed to each other only on the inner side of the outer peripheral wall portion 41. At this time, the V-phase neutral wire 47-V1 and the W-phase neutral wire 47-W2 among the three neutral wires 47 are routed clockwise, the U-phase neutral wire 47-U3 is routed counterclockwise, and the three neutral wires 47 are drawn to the inner side of the outer peripheral wall portion 41 from the third drawing slit 44A3.

As illustrated in FIG. 12D, among the nine neutral wires 47, every three neutral wires 47 form one set, and three sets of neutral wires 47 are drawn from the outer side to the inner side of the outer peripheral wall portion 41 of the upper insulator 24 through each of the first drawing slit 44A1, the second drawing slit 44A2, and the third drawing slit 44A3. The three drawing slits, the first drawing slit 44A1, the second drawing slit 44A2, and the third drawing slit 44A3, are arranged close to each other in the circumferential direction of the stator 22, whereby work of twisting the three sets of neutral wires 47 together (described later) can be easily performed.

In the stator 22, since the nine neutral wires 47 are fixed on the inner side of the upper insulator 24 via the drawing slits 44A, for example, it is possible to prevent the movement of the neutral wires 47 routed along the outer peripheral surface of the upper insulator 24 in the assembling work. In addition, in the stator 22, every three sets of neutral wires 47 connected at the neutral point 51 pass through respective drawing slits 44A and are twisted and fixed with each other. Thus, it becomes possible to easily perform a work of connecting the three neutral wires 47 as one set at the neutral point 51.

[Process of Forming Neutral Point]

Figure 13A:
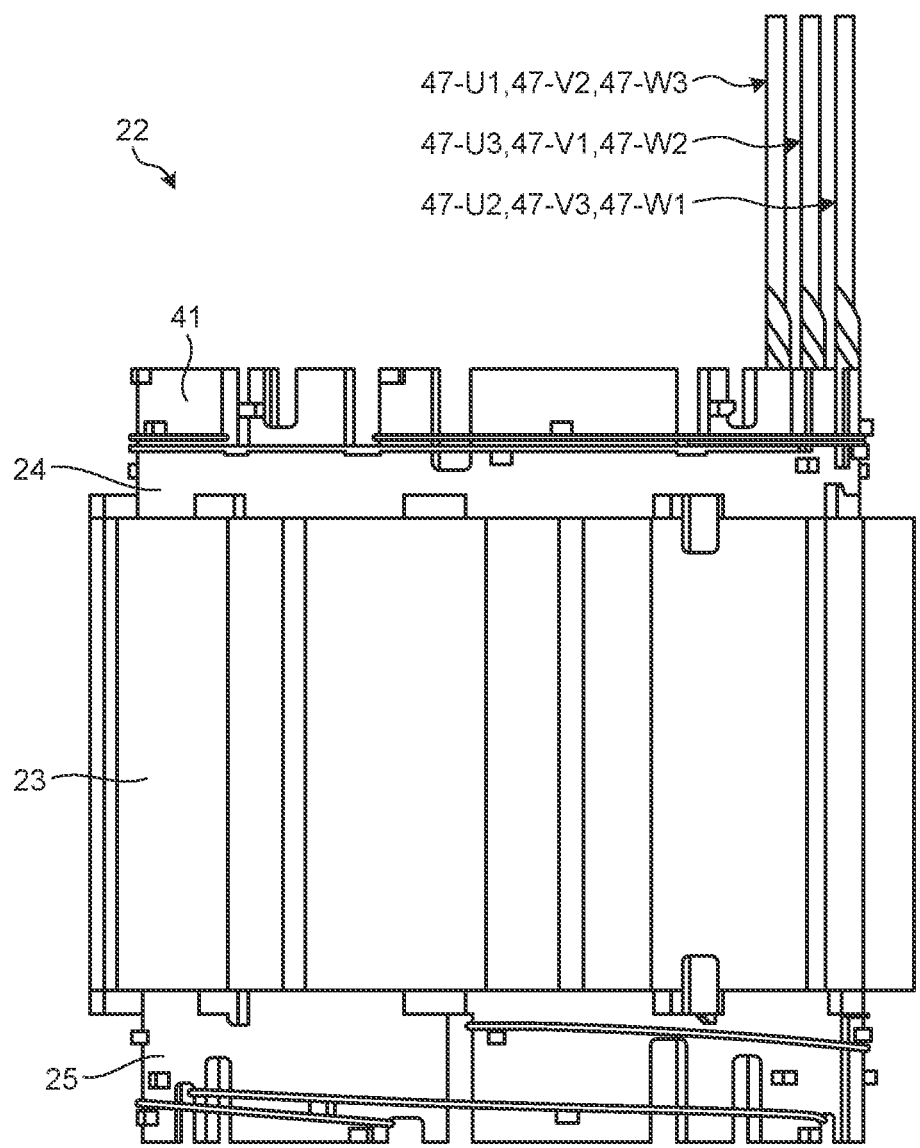
FIG. 13A is a side view illustrating a state in which lengths of three sets of neutral wires are made to be the same in the embodiment.
Figure 13B:
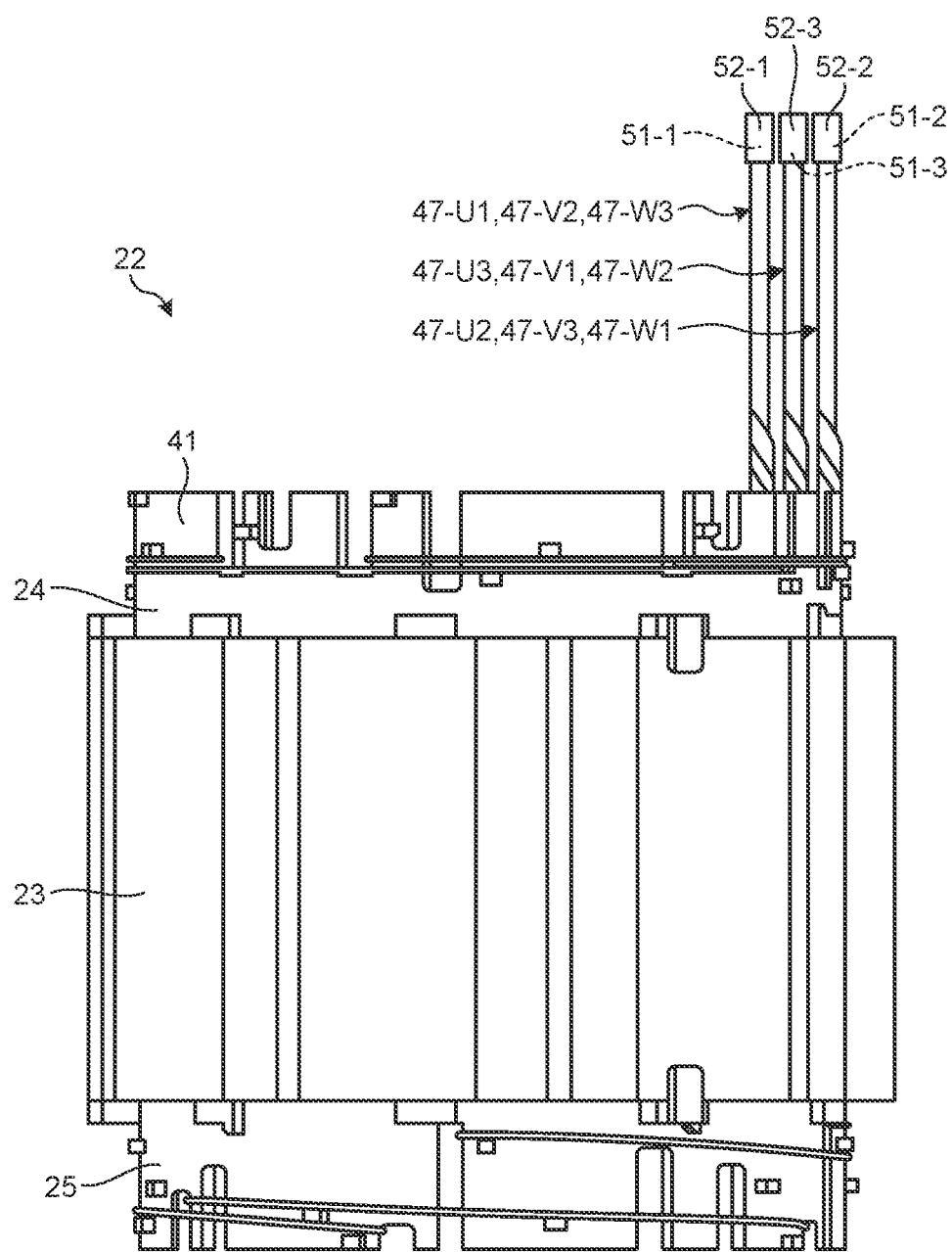
FIG. 13B is a side view illustrating a state in which each of the three sets of neutral wires is joined by crimping in the embodiment.

FIG. 13A is a side view illustrating a state in which lengths of the three sets of neutral wires 47 are made to be the same in the embodiment. FIG. 13B is a side view illustrating a state in which each of the three sets of neutral wires 47 is joined by crimping in the embodiment. As illustrated in FIG. 13A, the lengths of the three sets of neutral wires 47, which are drawn to the inner side of the outer peripheral wall portion 41 from the three respective drawing slits 44A, from the outer peripheral wall portion 41, are made to be the same by cutting one ends. Since the three sets of neutral wires 47 pass through the respective drawing slits 44A and are twisted with each other, the lengths of the respective neutral wires 47 can be easily made to be the same. Subsequently, as illustrated in FIG. 13B, each of the three sets of neutral wires 47 is joined by crimping via the splice terminal 52. Three neutral wires 47 are bundled into one set by passing through respective drawing slits 44A. Thus, when the U-phase, V-phase, and W-phase neutral wires 47 are joined via the splice terminal 52, it is possible to prevent phases to be connected to each other from being joined wrongly, and workability in assembling is improved.

Figure 13C:
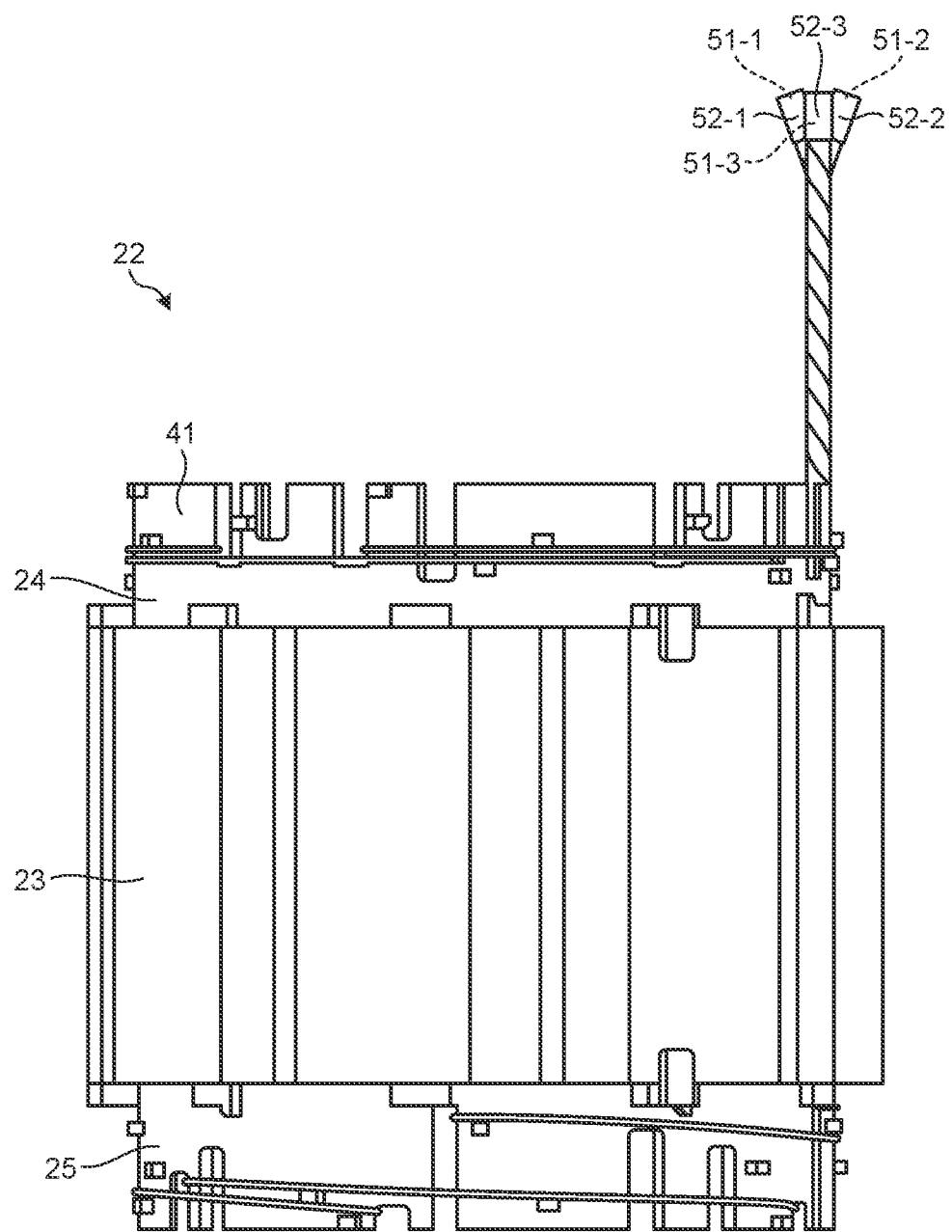
FIG. 13C is a side view illustrating a state in which the three sets of neutral wires are bundled in the embodiment.
Figure 13D:
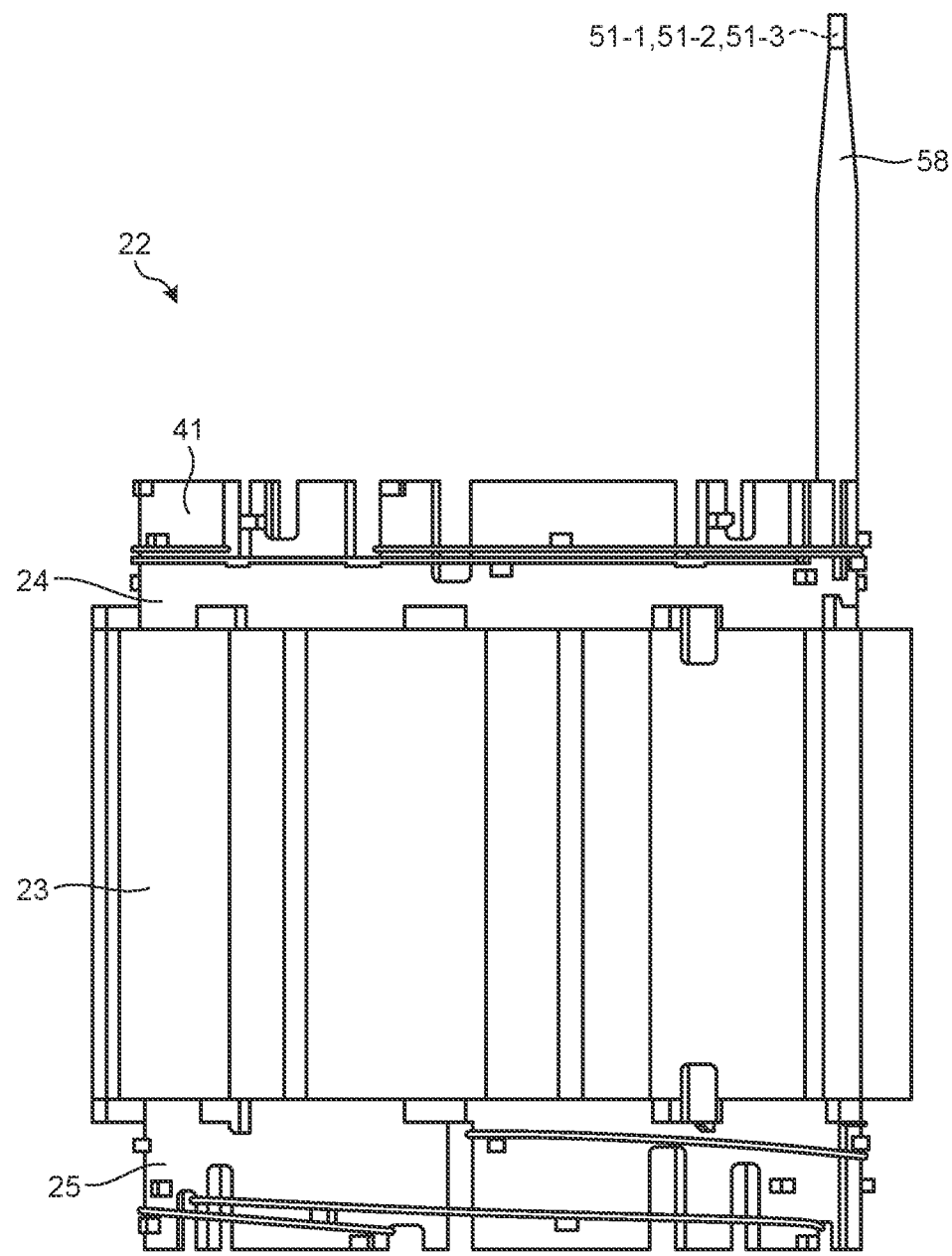
FIG. 13D is a side view illustrating a state in which the bundled neutral wires are covered with an insulating tube in the embodiment.

FIG. 13C is a side view illustrating a state in which the three sets of neutral wires 47 are bundled in the embodiment. FIG. 13D is a side view illustrating a state in which the bundled neutral wires 47 are covered with the insulating tube 58 in the embodiment. As illustrated in FIG. 13C, the three sets of neutral wires 47 are twisted to be bundled. By bundling the three sets of neutral wires 47 as described above, tension on the neutral wires 47 routed along the outer peripheral wall portion 41 of the upper insulator 24, is further increased, and movement of the neutral wires 47 due to a vibration of the stator 22 during an operation of the compressor 1, is controlled.

Note that, in the present embodiment, three sets of neutral wires 47 are bundled and twisted from the respective drawing slits 44A to the splice terminals 52 (neutral points 51). However, this structure is not a limitation, and it is sufficient that only a part of the three sets of neutral wires 47 are twisted.

Subsequently, as illustrated in FIG. 13D, the bundled three sets of neutral wires 47 and the splice terminals 52 are covered with the insulating tube 58. Thus, insulation is made between the respective drawing slits 44A and the neutral points 51. Since the three sets of neutral wires 47 are bundled as described above, it becomes possible to insulate the three sets of neutral wires 47 collectively with one insulating tube 58 without performing insulation thereof individually, and to control an increase in a manufacturing cost. As illustrated in FIG. 2, neutral point 51 sides of the three sets of neutral wires 47, which are covered with the insulating tube 58, are inserted into and held in the gap G between adjacent winding portions 45.

The neutral point 51 sides of the three sets of neutral wires 47 are inserted into and arranged in an outer peripheral side of the gap G between the winding portions 45 in a radial direction of the stator 22, and interference with the rotor 21 is controlled. Also, the neutral point 51 sides of the three sets of neutral wires 47 are inserted in a direction of a central axis of the stator 22, that is, in a top-bottom direction in the compressor 1. A neutral point 51 side of the insulating tube 58 is formed in a flat band shape. The flat insulating tube 58 is inserted in the direction of the central axis of the stator 22, and is prevented from becoming flow resistance for a refrigerant or refrigeration oil passing through the gap G. Thus, it is possible to control an increase in a flow velocity of the refrigeration oil passing through the gap G, and to control an amount of the refrigeration oil discharged to the outside of the compressor 1.

Effects of Embodiments

As described above, in the winding wires 46 of the three-phase motor 6 of the embodiment, the plurality of neutral wires 47 are routed along the outer peripheral surface of the outer peripheral wall portion 41 of the upper insulator 24, pass through the drawing slits 44A, and are drawn from the outer side to the inner side of the upper insulator 24, and the plurality of neutral wires 47 are fixed to each other only on the inner side of the upper insulator 24. For example, since three neutral wires 47 connected at the neutral point 51 are fixed to each other as one set on the inner side of the upper insulator 24 while passing through the drawing slit 44A, nine neutral wires 47 can be easily handled, and a mistake in a combination of three neutral wires 47 connected in a predetermined combination, can be prevented compared to a case where nine neutral wires 47 are joined by soldering. Thus, the workability in assembling of the three-phase motor 6 can be improved, and efficiency of assembling work can be improved.

Furthermore, since the three neutral wires 47 are twisted and fixed to each other only on the inner side of the outer peripheral wall portion 41 of the upper insulator 24, portions twisted to fix the three neutral wires 47 to each other do not occur on the outer side of the outer peripheral wall portion 41. Therefore, a distance between the neutral wires 47 drawn along the outer peripheral surface of the outer peripheral wall portion 41 and the container 2 is appropriately secured, and the insulation distance of the neutral wire 47 can be easily secured. In addition, since the three neutral wires 47 pass through the respective drawing slits 44A without being twisted with each other on the outer side of the upper insulator 24, it is possible to smoothly drawing the neutral wires 47 from the outer side to the inner side of the upper insulator 24 in a state where the movement of the neutral wires 47 is not restricted, such that the neutral wires 47 can be easily handled.

In addition, in the winding wires 46 of the three-phase motor 6, the three sets of neutral wires 47 are individually drawn from the outer side to the inner side of the upper insulator through the first drawing slit 44A1, the second drawing slit 44A2, and the third drawing slit 44A3, such that it is also possible to easily identify the three sets of neutral wires 47 by visually observing the respective drawing slits 44A through which the three sets of neutral wires 47 pass. Note that, in the present embodiment, the three drawing slits, the first drawing slit 44A1, the second drawing slit 44A2, and the third drawing slit 44A3, are used, but the three sets of neutral wires 47 may be drawn from the outer side to the inner side of the upper insulator 24 through one common drawing slit 44A.

In the winding wires 46 of the three-phase motor 6, the three neutral wires 47 are fixed to each other by being twisted with each other on the inner side of the upper insulator 24. As a result, the three neutral wires 47 can be easily temporarily fixed to the upper insulator 24 that is mounted on the stator 22.

In addition, in the three-phase motor 6 of the embodiment, the three drawing slits 44A of the upper insulator 24 are arranged close to each other in the circumferential direction of the outer peripheral wall portion 41 of the upper insulator 24. This makes it easy to twist the three sets of neutral wires 47 drawn from the three drawing slits 44A, respectively, such that the three sets of neutral wires 47 can be easily bundled. Also, it becomes possible to cut a plurality of sets of neutral wires 47 while easily making lengths thereof from the respective drawing slits 44A to the neutral points 51 the same.

In addition, in the three-phase motor 6 of the embodiment, the three sets of neutral wires 47 connected at the three neutral points 51, respectively, are twisted into a bundle on the inner side of the outer peripheral wall portion 41 of the upper insulator 24. This makes it possible to easily bundle and fix the three sets of neutral wires 47.

Also, the three sets of neutral wires 47 in the three-phase motor 6 of the embodiment, are covered with the insulating tube 58, and inserted into the gap G between adjacent winding portions 45. As a result, movement of the three sets of neutral wires 47 is controlled when the three-phase motor 6 is used, and the three sets of neutral wires 47 can be stably held by the gap G in the stator 22. Also, since the three sets of neutral wires 47 are covered with the insulating tube 58, it becomes possible to insulate the three sets of neutral wires 47 collectively and to control an increase in a manufacturing cost of the three-phase motor 6 compared to a structure in which three sets of neutral wires 47 are individually insulated.

Also, the three sets of neutral wires 47 in the three-phase motor 6 of the embodiment, are inserted to the outer peripheral side of the gap G in the radial direction of the stator 22. As a result, it is possible to avoid interference between the neutral wires 47, inserted into the gap G, and the rotor 21.

OTHER EMBODIMENTS

In the embodiment described above, the neutral point 51 is formed in a state where the three sets of neutral wires 47 are drawn to the inner side of the outer peripheral wall portion 41 of the upper insulator 24, but the present invention is not limited to such an assembling procedure. Another embodiment, in which the process of drawing the neutral wire 47 and the process of forming the neutral point 51 are different, will be described.

FIG. 14 is a perspective view illustrating a state, in which every three neutral wires 47 of nine neutral wires 47 pass through the drawing slits 44A and the pull-out slit 44B, and are temporarily fixed in another embodiment. As illustrated in FIG. 14, the three neutral wires to which the neutral point is connected, may be temporarily fixed to the outer peripheral wall portion by being drawn to the inner side of the outer peripheral wall portion 41 through respective drawing slits 44A and then pulled out to the outer side of the outer peripheral wall portion 41 through the pull-out slit 44B. The three neutral wires 47 are hooked and locked in the outer peripheral wall portion 41 by passing through each of the drawing slit 44A and the pull-out slit 44B, such that the temporarily fixed state is temporarily maintained. That is, the three neutral wires 47 are temporarily pulled out to the outer side through the inner side of the outer peripheral wall portion 41 without being twisted and fixed to each other on the inner side of the upper insulator 24.

Figure 15A:
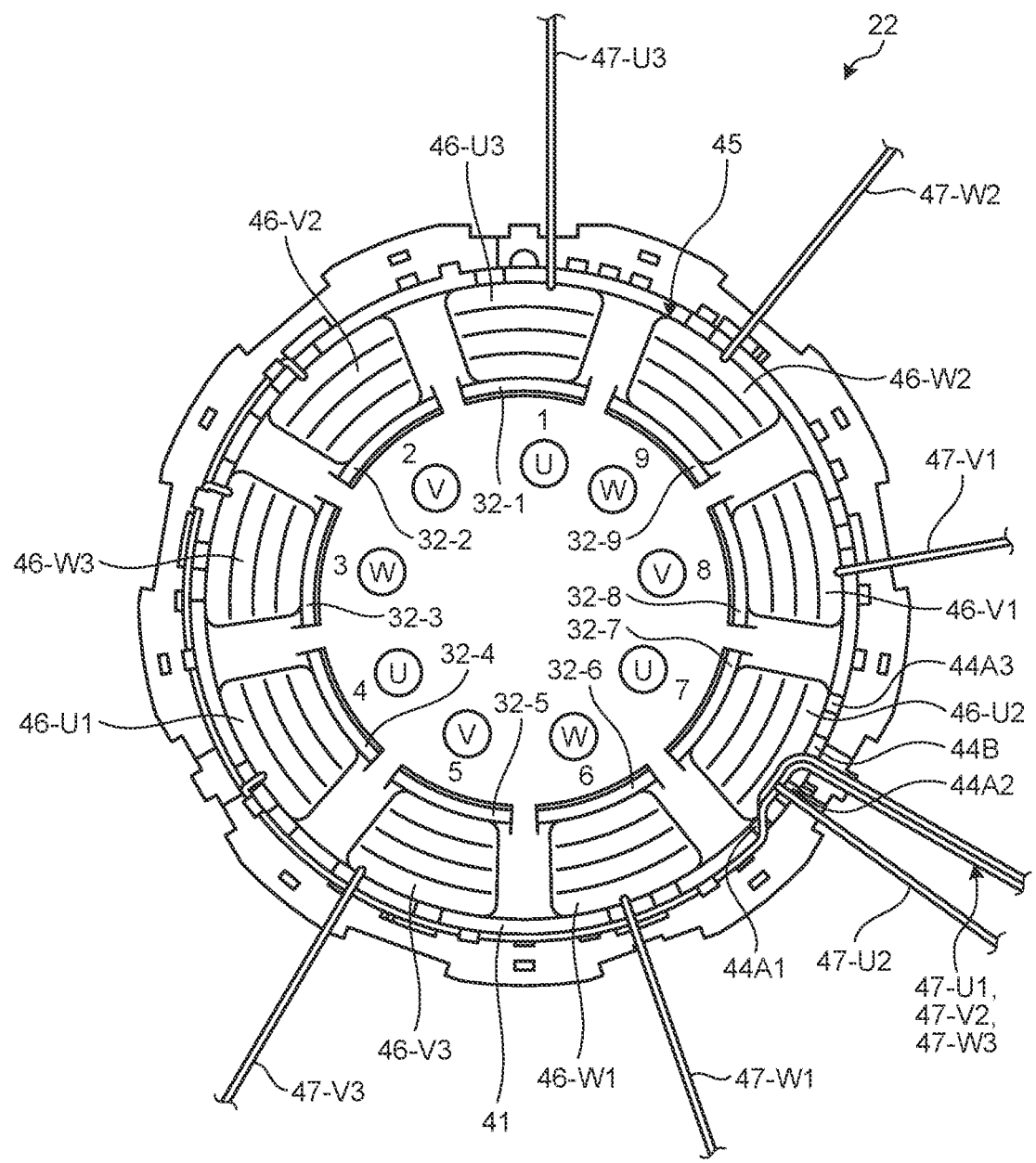
FIG. 15A is a plan view illustrating a state in which three neutral wires among nine neutral wires are temporarily fixed in another embodiment.
Figure 15B:
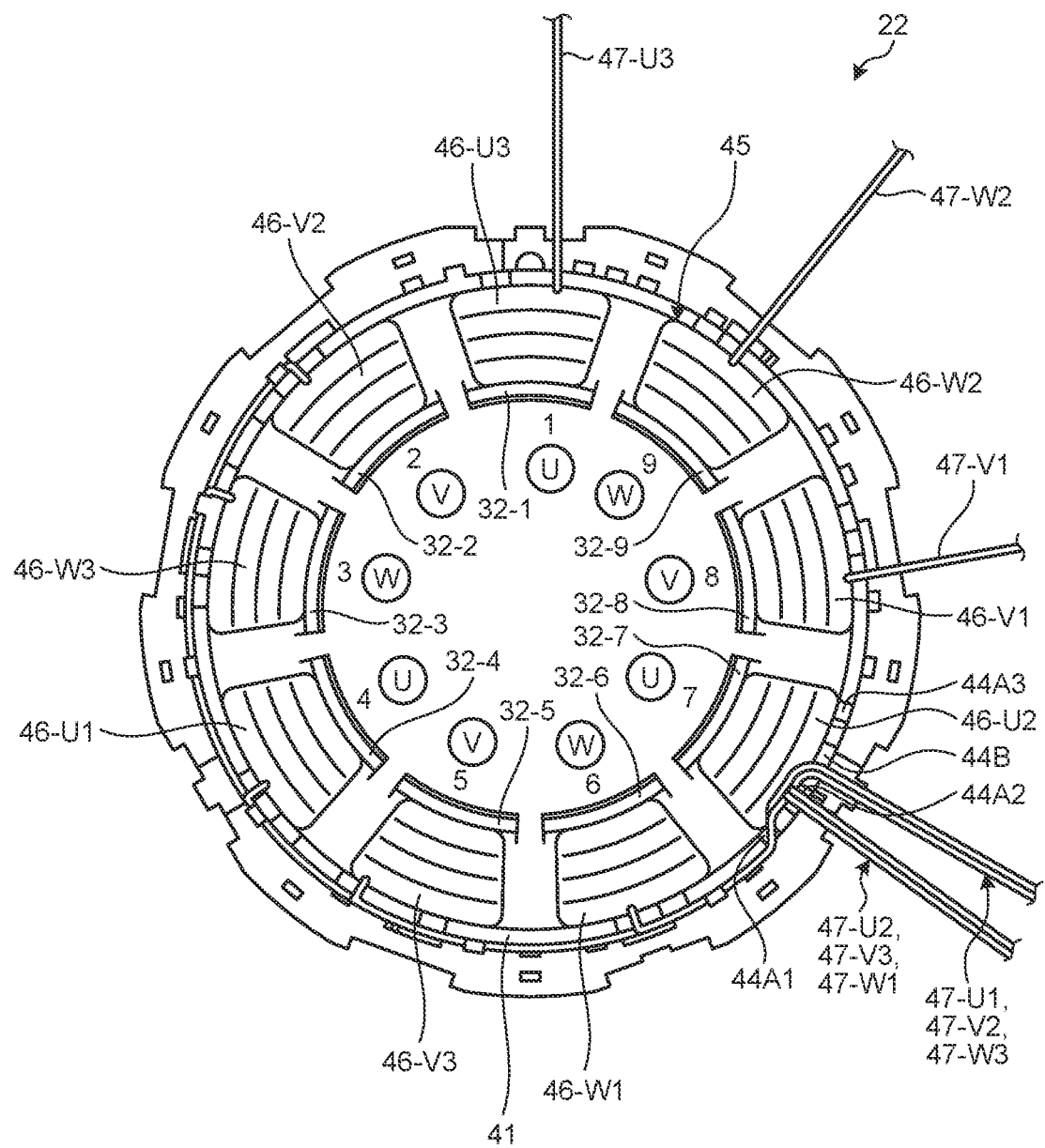
FIG. 15B is a plan view illustrating a state in which three neutral wires among the remaining six neutral wires are temporarily fixed in another embodiment.
Figure 15C:
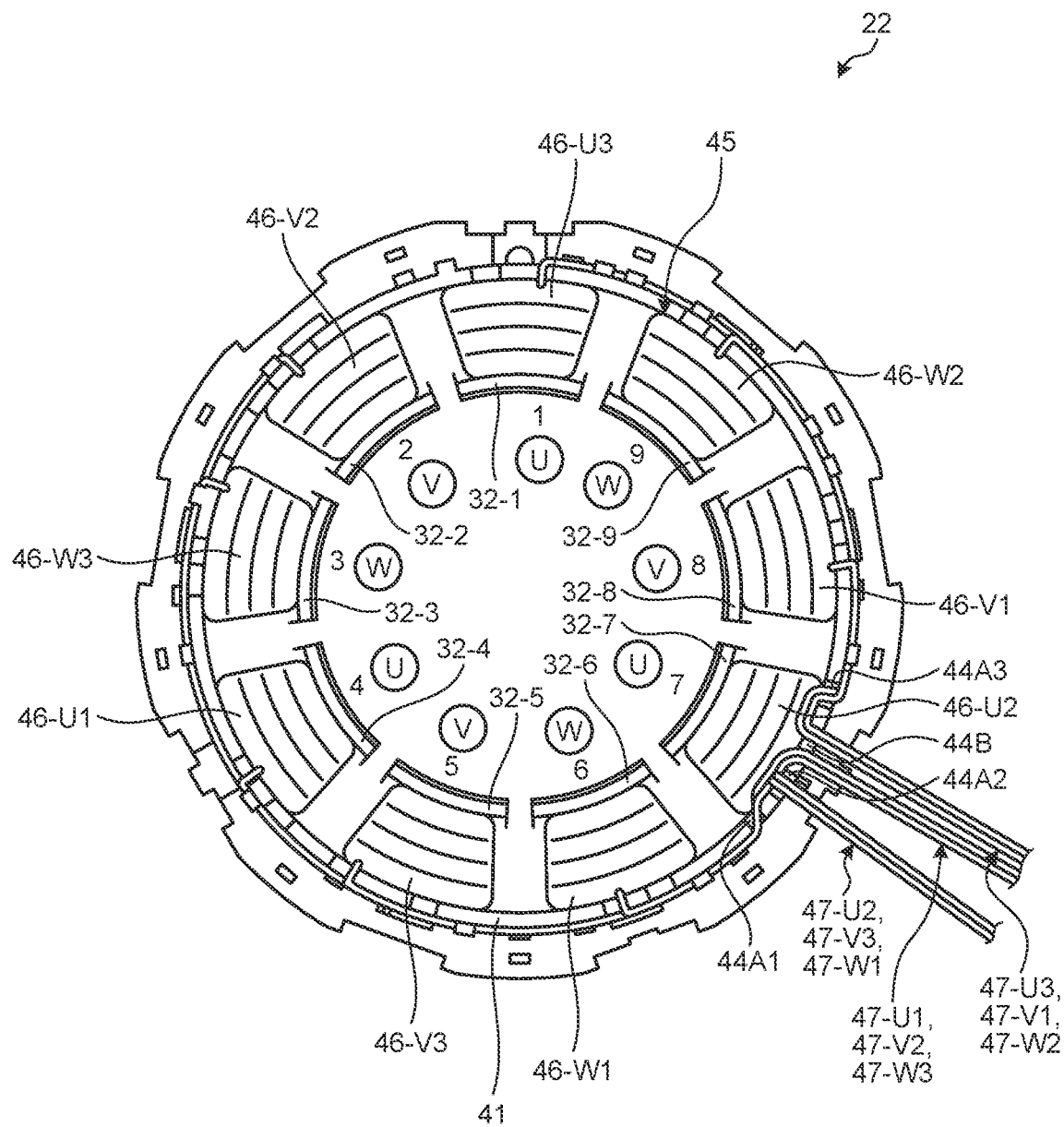
FIG. 15C is a plan view illustrating a state in which the remaining three neutral wires are temporarily fixed in another embodiment.
Figure 15D:
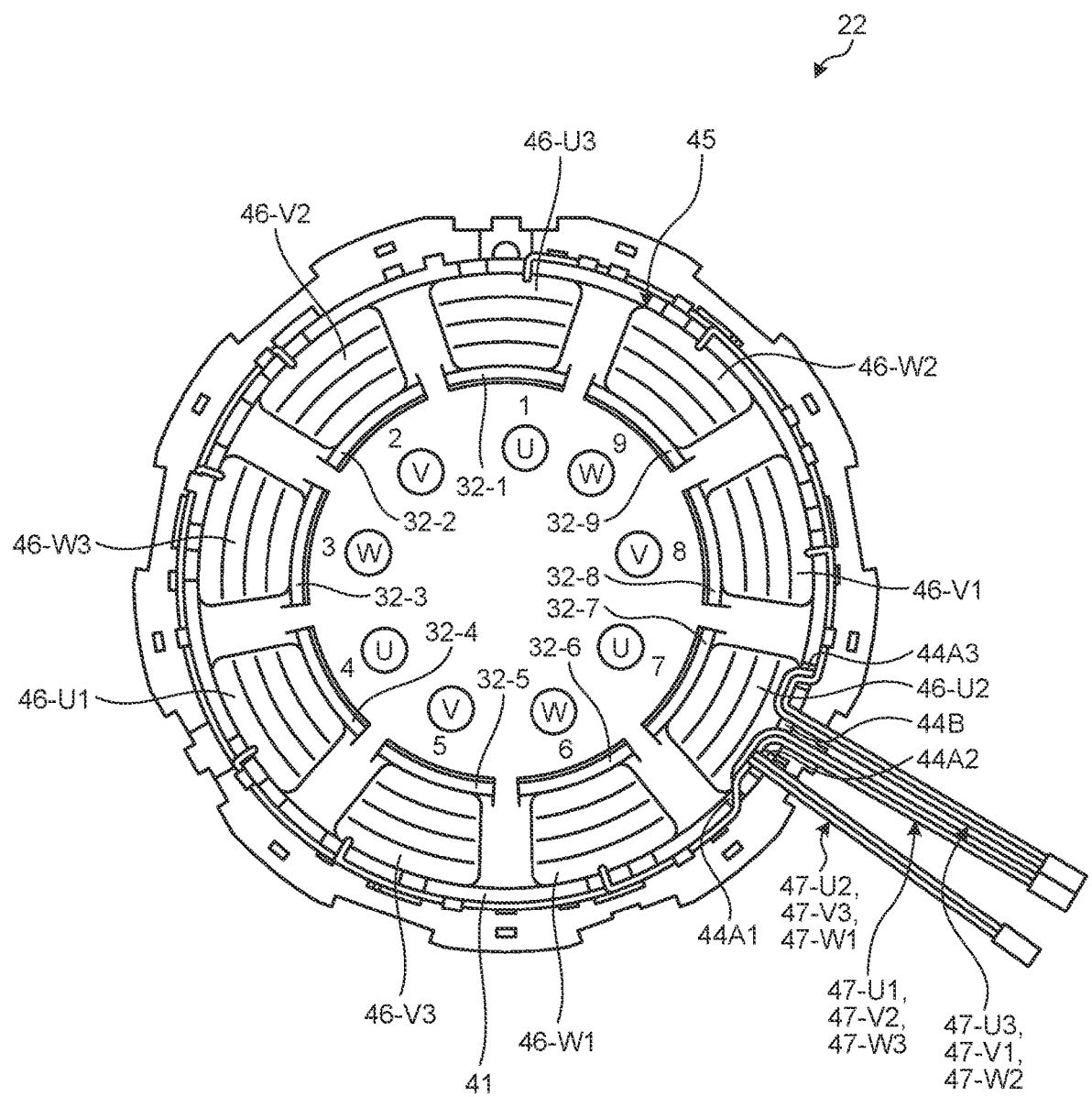
FIG. 15D is a plan view illustrating a state in which each of three sets of neutral wires is joined by crimping in another embodiment.
Figure 15E:
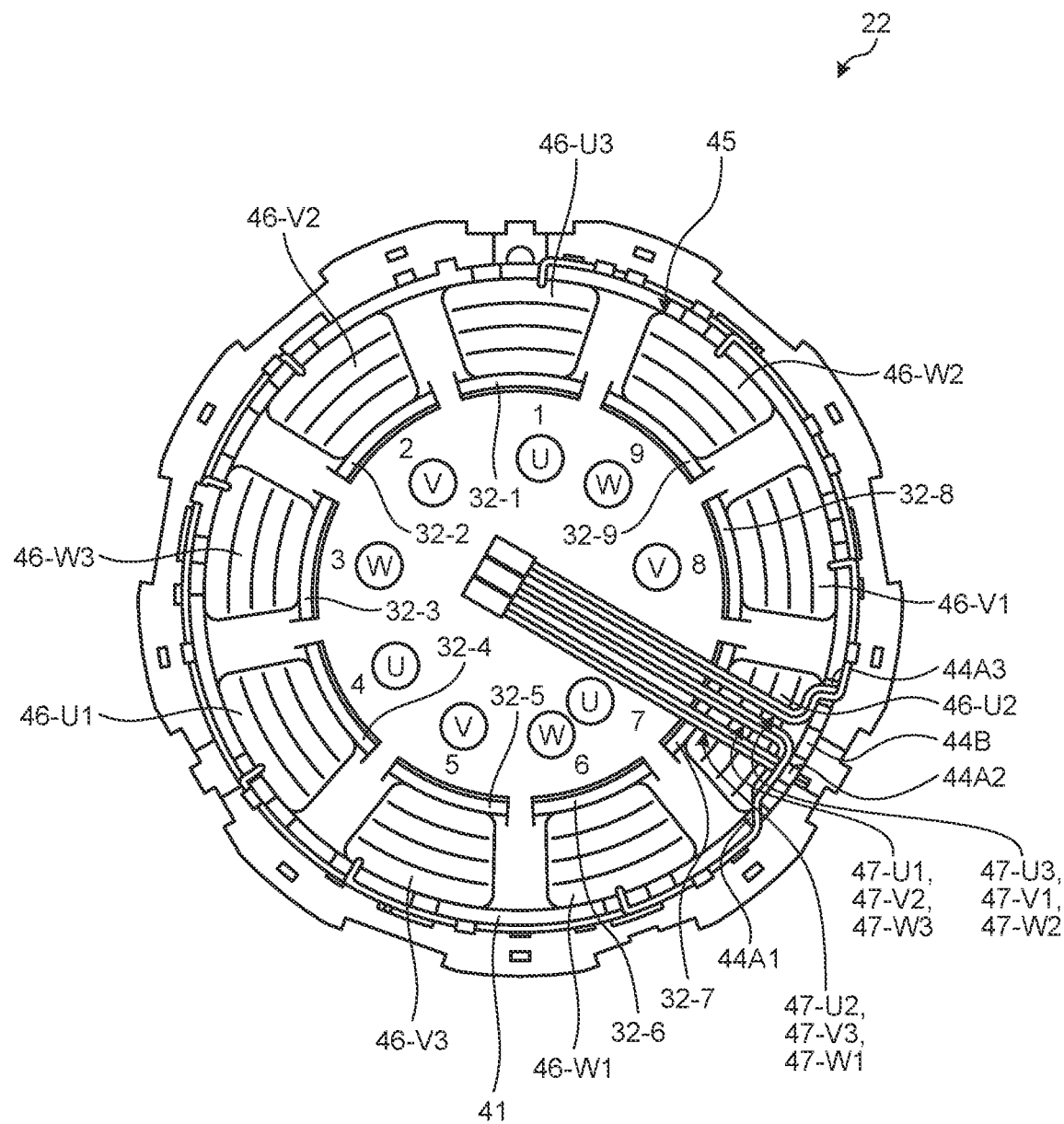
FIG. 15E is a plan view illustrating a state in which three sets of neutral wires are drawn to the inner side of the upper insulator in another embodiment.

FIG. 15A is a plan view illustrating a state in which three neutral wires 47 among nine neutral wires 47 are temporarily fixed in another embodiment. FIG. 15B is a plan view illustrating a state in which three neutral wires 47 among the remaining six neutral wires 47 are temporarily fixed in another embodiment. FIG. 15C is a plan view illustrating a state in which the remaining three neutral wires 47 are temporarily fixed in another embodiment. FIG. 15D is a plan view illustrating a state in which each of three sets of neutral wires 47 is joined by crimping in another embodiment. FIG. 15E is a plan view illustrating a state in which three sets of neutral wires 47 are drawn to the inner side of the upper insulator 24 in another embodiment.

First, as illustrated in FIGS. 12A and 15A, among the nine neutral wires 47, the V-phase neutral wire 47-V2, the W-phase neutral wire 47-W3, and the U-phase neutral wire 47-U1, which are respectively pulled out from the second, third, and fourth winding portions 45 in the drawing, are routed along the outer peripheral surface of the upper insulator 24, and drawn from the outer side to the inner side of the outer peripheral wall portion 41 while passing through, for example, the first drawing slit 44A1 positioned in the vicinity of the seventh winding portion 45, and the nine neutral wires 47 are bent and pulled out from the inner side to the outer side of the outer peripheral wall portion 41 through the pull-out slit 44B. At this time, the three neutral wires 47 drawn to the inner side of the outer peripheral wall portion 41 through the first drawing slit 44A1, are temporarily fixed to the outer peripheral wall portion 41 by being bent and pulled out from the inner side to the outer side of the outer peripheral wall portion 41 through the pull-out slit 44B without being twisted with each other on the inner side of the upper insulator 24.

Subsequently, similarly to the three neutral wires 47 passing through the first drawing slit 44A1 and fixed to each other only on the inner side of the outer peripheral wall portion 41, as illustrated in FIGS. 15A and 15B, among the remaining six neutral wires 47, the V-phase neutral wire 47-V3, the W-phase neutral wire 47-W1, and the U-phase neutral wire 47-U2, which are respectively pulled out from the fifth, sixth, and seventh winding portions 45 in the drawing, are routed along the outer peripheral surface of the upper insulator 24, and drawn from the outer side to the inner side of the outer peripheral wall portion 41 while passing through the first drawing slit 44A1 positioned in the vicinity of the seventh winding portion 45, and the three neutral wires 47 are bent and pulled out from the inner side to the outer side of the outer peripheral wall portion 41 through the second drawing slit 44A2 that is adjacent to the first drawing slit 44A1. At this time, the three neutral wires 47 drawn to the inner side of the outer peripheral wall portion 41 through the first drawing slit 44A1, are temporarily fixed to the outer peripheral wall portion 41 by being bent and pulled out from the inner side to the outer side of the outer peripheral wall portion 41 through the second drawing slit 44A2 without being twisted with each other on the inner side of the upper insulator 24. Note that the present invention is not limited to such routing of the neutral wires 47, and for example, the three neutral wires 47 may be drawn from the outer side to the inner side of the outer peripheral wall portion 41 through the second drawing slit 44A2, and may be bent and pulled out from the inner side to the outer side of the outer peripheral wall portion 41 through the pull-out slit 44B.

Subsequently, similarly to the three neutral wires 47 passing through the second drawing slit 44A2 and fixed to each other only on the inner side of the outer peripheral wall portion 41, as illustrated in FIGS. 15B and 15C, among the remaining three neutral wires 47, the V-phase neutral wire 47-V1, the W-phase neutral wire 47-W2, and the U-phase neutral wire 47-U3, which are respectively pulled out from the eighth, ninth, and first winding portions 45 in the drawing, are routed along the outer peripheral surface of the upper insulator 24, and drawn from the outer side to the inner side of the outer peripheral wall portion 41 while passing through the third drawing slit 44A3 positioned in the vicinity of the seventh winding portion 45, and the three neutral wires 47 are bent and pulled out from the inner side to the outer side of the outer peripheral wall portion 41 through the pull-out slit 44B. At this time, the three neutral wires 47 drawn to the inner side of the outer peripheral wall portion 41 through the third drawing slit 44A3, are temporarily fixed to the outer peripheral wall portion 41 by being bent and pulled out from the inner side to the outer side of the outer peripheral wall portion 41 through the pull-out slit 44B without being twisted with each other on the inner side of the upper insulator 24.

Note that, although not illustrated, when three sets of neutral wires 47 are pulled out through the pull-out slit 44B, three locking grooves (not illustrated), in which the three sets of neutral wires 47 are individually locked in the pull-out slit 44B, may be formed in the pull-out slit 44B.

In addition, as illustrated in FIG. 15C, the lengths of the three sets of neutral wires 47, which are pulled out to the outer peripheral wall portion 41 from the second drawing slit, the pull-out slit, from the outer peripheral wall portion 41, are made to be the same by cutting one ends. Subsequently, as illustrated in FIG. 15D, each of the three sets of neutral wires 47 is joined by crimping via the splice terminal 52. Three neutral wires 47 temporarily fixed to the outer peripheral wall portion 41 of the upper insulator 24, are bundled into one set. Thus, when the U-phase, V-phase, and W-phase neutral wires 47 are joined via the splice terminal 52, it is possible to prevent phases to be connected to each other from being joined wrongly, and workability in assembling is improved. As illustrated in FIG. 15E, the three sets of neutral wires 47 connected at the neutral points 51 via the splice terminals 52, are returned from the second drawing slit 44A2 and the pull-out slit 44B to the inner side of the outer peripheral wall portion 41, and are inserted into the upper insulator 24.

Figure 16:
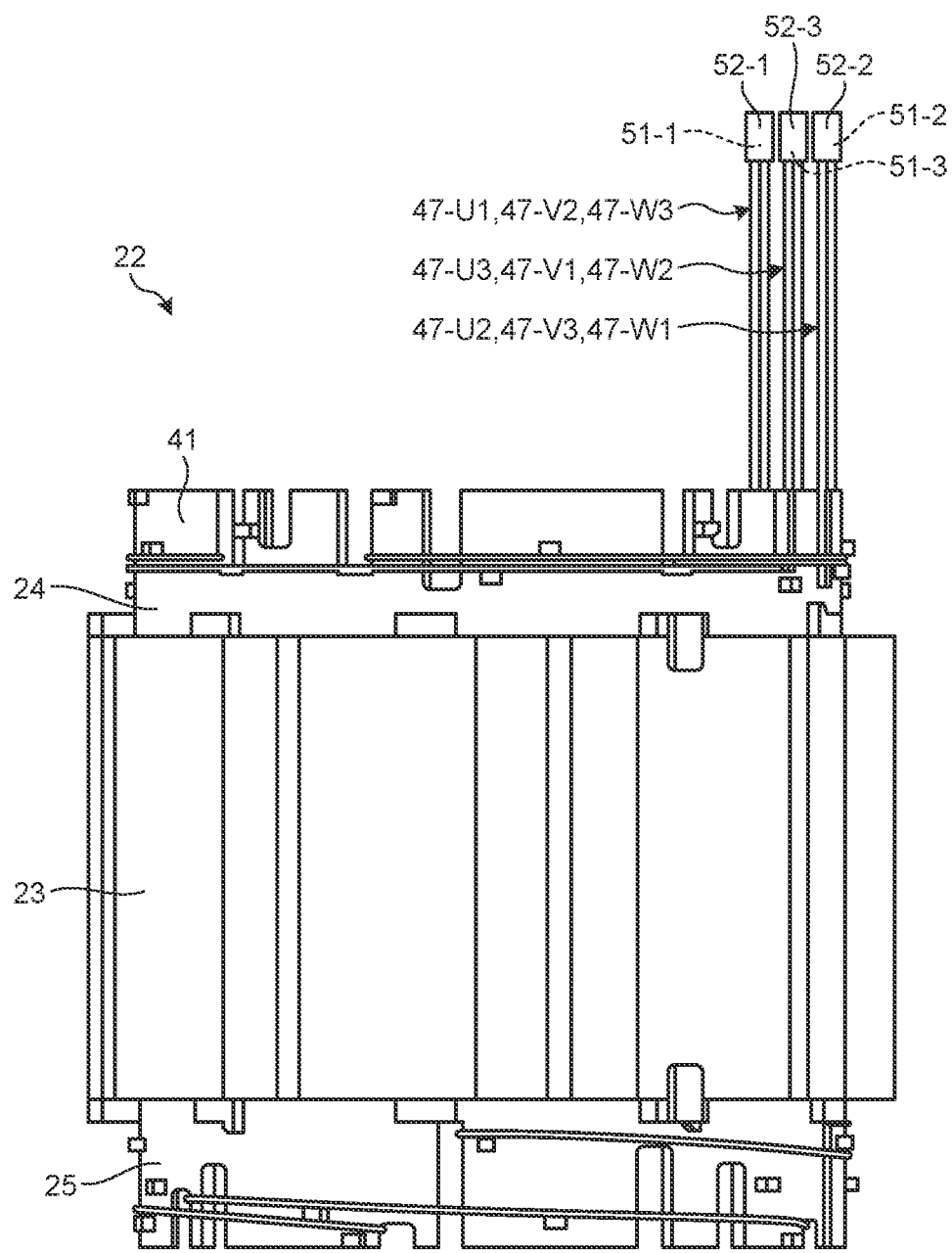
FIG. 16 is a side view for describing a state in which each of three sets of neutral wires is joined by crimping in another embodiment.

FIG. 16 is a side view for describing a state in which each of three sets of neutral wires 47 is joined by crimping in another embodiment. As illustrated in FIG. 16, in another embodiment, three neutral wires 47 of each of the three sets of neutral wires 47 connected at the neutral point 51 via the splice terminal 52, are fixed to each other by the splice terminal 52 without being twisted with each other. Thereafter, similarly to the manufacturing process of the embodiment described above, as illustrated in FIG. 13C, the three sets of neutral wires 47 are twisted to be bundled. Therefore, the three sets of neutral wires 47 are fixed to each other only on the inner side of the outer peripheral wall portion 41 of the upper insulator 24. Subsequently, as illustrated in FIG. 13D, the bundled three sets of neutral wires 47 and the splice terminals 52 are covered with the insulating tube 58. Thus, insulation is made between the respective drawing slits 44A and the neutral points 51. As illustrated in FIG. 2, neutral point 51 sides of the three sets of neutral wires 47 covered with the insulating tube 58, are inserted into and held in the gap G between adjacent winding portions 45.

Effects of Other Embodiments

In the upper insulator 24 of the three-phase motor 6 of another embodiment described above, the pull-out slit 44B for bending and pulling out the three neutral wires 47 fixed to each other on the inner side from the inner side to the outer side of the upper insulator 24 is provided in such a manner as to penetrate from the inner side to the outer side. As a result, every three neutral wires can be hooked and temporarily fixed to the outer peripheral wall portion of the insulator. Therefore, similarly to the above-described embodiment, it is possible to easily handle the nine neutral wires 47 and to prevent a mistake in a combination of three neutral wires 47 connected in a predetermined combination. Thus, the workability in assembling of the three-phase motor 6 can be improved, and efficiency of assembling work can be improved.

In addition, also in other embodiments, since the three sets of neutral wires 47 are twisted and fixed to each other only on the inner side of the outer peripheral wall portion 41 of the upper insulator 24, portions twisted to fix the three neutral wires 47 to each other do not occur on the outer side of the outer peripheral wall portion 41. Therefore, a distance between the neutral wires 47 drawn along the outer peripheral surface of the outer peripheral wall portion 41 and the container 2, is appropriately secured, and the insulation distance of the neutral wire 47 can be easily secured. In addition, since the three neutral wires 47 pass through the respective drawing slits 44A without being twisted with each other on the outer side of the upper insulator 24, it is possible to smoothly drawing the neutral wires 47 from the outer side to the inner side of the upper insulator 24 in a state where the movement of the neutral wires 47 is not restricted, such that the neutral wires 47 can be easily handled.

In addition, the pull-out slit 44B of the upper insulator 24 in the three-phase motor 6 is arranged close to the drawing slit 44A in the circumferential direction of the outer peripheral wall portion 41 of the upper insulator 24. As a result, the three neutral wires 47 can be easily routed across the drawing slit 44A and the pull-out slit 44B, and the neutral wires 47 can be easily temporarily fixed.

Note that a three-phase motor is applied to a rotary compressor in the present embodiment, but its application is not limited to the rotary compressor, and the three-phase motor may also be applied to a scroll compressor. Also, the winding procedure of the winding wire 46 is not limited to the present embodiment. For example, the winding wires may be respectively wound around teeth.

REFERENCE SIGNS LIST

1 COMPRESSOR
3 SHAFT (ROTATING SHAFT)
5 COMPRESSION UNIT
6 THREE-PHASE MOTOR
21 ROTOR
22 STATOR
24 UPPER INSULATOR (INSULATOR)
32-1 FIRST STATOR CORE TOOTH PORTION (TOOTH)
32-2 SECOND STATOR CORE TOOTH PORTION (TOOTH)
32-3 THIRD STATOR CORE TOOTH PORTION (TOOTH)
32-4 FOURTH STATOR CORE TOOTH PORTION (TOOTH)
32-5 FIFTH STATOR CORE TOOTH PORTION (TOOTH)
41 OUTER PERIPHERAL WALL PORTION
44 SLIT (NOTCH)
44A1 FIRST DRAWING SLIT (DRAWING NOTCH)
44A2 SECOND DRAWING SLIT (DRAWING NOTCH)
44A3 THIRD DRAWING SLIT (DRAWING NOTCH)
44B PULL-OUT SLIT (PULL-OUT NOTCH)
45 WINDING PORTION
46(46-U1 to 46-U3) PLURALITY OF U-PHASE WINDING WIRES
46(46-V1 to 46-V3) PLURALITY OF V-PHASE WINDING WIRES
46(46-W1 to 46-W3) PLURALITY OF W-PHASE WINDING WIRES
47(47-U1 to 47-U3) PLURALITY OF U-PHASE NEUTRAL WIRES
47(47-V1 to 47-V3) PLURALITY OF V-PHASE NEUTRAL WIRES
47(47-W1 to 47-W3) PLURALITY OF W-PHASE NEUTRAL WIRES
48-U1 to 48-U3 PLURALITY OF U-PHASE POWER WIRES
48-V1 to 48-V3 PLURALITY OF V-PHASE POWER WIRES
48-W1 to 48-W3 PLURALITY OF W-PHASE POWER WIRES
49-U1 FIRST U-PHASE CONNECTING WIRE PORTION
49-U2 SECOND U-PHASE CONNECTING WIRE PORTION
49-V1 FIRST V-PHASE CONNECTING WIRE PORTION
49-V2 SECOND V-PHASE CONNECTING WIRE PORTION
49-W1 FIRST W-PHASE CONNECTING WIRE PORTION
49-W2 SECOND W-PHASE CONNECTING WIRE PORTION
51(51-1 to 51-3) NEUTRAL POINT
52(52-1) FIRST SPLICE TERMINAL (CONNECTING MEMBER)
52(52-2) SECOND SPLICE TERMINAL (CONNECTING MEMBER)
52(52-3) THIRD SPLICE TERMINAL (CONNECTING MEMBER)
58 INSULATING TUBE (INSULATING MEMBER)
G GAP

The invention claimed is:

1. A motor comprising:
a rotor; a stator that generates a magnetic field for rotating the rotor; and a cylindrical insulator fixed to an end portion of the stator, wherein
the stator includes
a plurality of teeth,
a plurality of winding wires each including a winding portion wound around each of the plurality of teeth, a neutral wire provided on one end side of the winding portion, and a power wire provided on an other end side of the winding portion, and
a neutral point at which a plurality of the neutral wires are electrically connected via a connecting member,
the insulator is provided with a drawing notch penetrating from an outer side to an inner side of the insulator,
the plurality of neutral wires are routed along an outer peripheral surface of the insulator and every three three-phase neutral wires of the plurality of neutral wires are bundled as a set, and
each of a plurality of sets of the neutral wires passes through the drawing notch, and the plurality of sets of the neutral wires are drawn from the outer side to the inner side of the insulator, and the plurality of sets of the neutral wires drawn to the inner side are twisted into a bundle and fixed.

2. The motor according to claim 1, wherein
a plurality of the drawing notches are arranged close to each other in a circumferential direction of the insulator.

3. The motor according to claim 1, wherein
the motor is a three-phase motor, and
the every three neutral wires of the plurality of neutral wires are joined by crimping via the connecting member.

4. The motor according to claim 1, wherein
a plurality of the winding portions are arranged side by side, and
the bundle is covered with an insulating member and is inserted into a gap between adjacent winding portions of the plurality of winding portions.

5. A compressor comprising:
the motor according to claim 1; and
a compression section that compresses a refrigerant when the rotor rotates a rotating shaft.

6. A motor comprising:
a rotor; a stator that generates a magnetic field for rotating the rotor; and a cylindrical insulator fixed to an end portion of the stator, wherein
the stator includes
a plurality of teeth,
a plurality of winding wires each including a winding portion wound around each of the plurality of teeth, a neutral wire provided on one end side of the winding portion, and a power wire provided on an other end side of the winding portion, and
a neutral point at which a plurality of the neutral wires are electrically connected via a connecting member,
the insulator is provided with a drawing notch penetrating from an outer side to an inner side of the insulator,
the plurality of neutral wires are routed along an outer peripheral surface of the insulator and every three three-phase neutral wires of the plurality of neutral wires are bundled as a set, and each of a plurality of sets of the neutral wires individually passes through the drawing notch that is different from each other and are drawn from the outer side to the inner side of the insulator, and the plurality of sets of the neutral wires are twisted into a bundle in the inner side of the insulator.

* * * * *